March 28, 1967 J. V. DAVIS ET AL 3,311,214

CONVEYING MACHINE

Filed Oct. 6, 1964

17 Sheets-Sheet 1

INVENTORS.
John V. Davis
Guy H. Cummings, Jr.
BY Richard C. Kayser
Giacomo R. Zambon
Harness, Dickey & Pierce
ATTORNEYS.

March 28, 1967 J. V. DAVIS ET AL 3,311,214
CONVEYING MACHINE
Filed Oct. 6, 1964 17 Sheets-Sheet 2
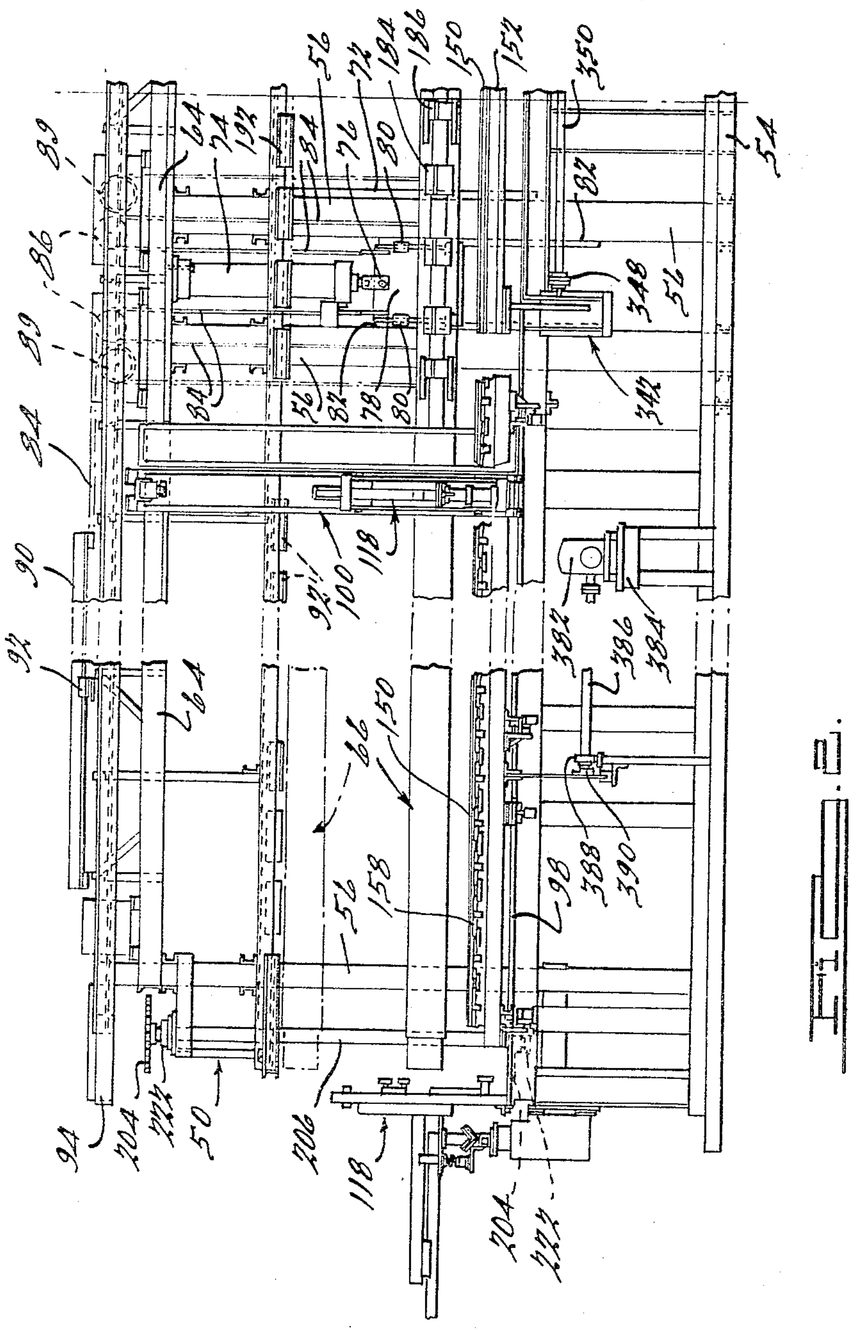
INVENTORS
John V. Davis
Guy A. Cummings, Jr.
BY Richard C. Kayser
Giacomo R. Zambon
Harness, Dickey & Pierce
ATTORNEYS March 28, 1967 J. V. DAVIS ET AL 3,311,214

CONVEYING MACHINE

Filed Oct. 6, 1964

17 Sheets-Sheet 3

INVENTORS
John V. Davis
Guy H. Cummings, Jr.
BY Richard C. Kayser
Giacomo R. Zambon
Barnes, Dickey & Pierce
ATTORNEYS.

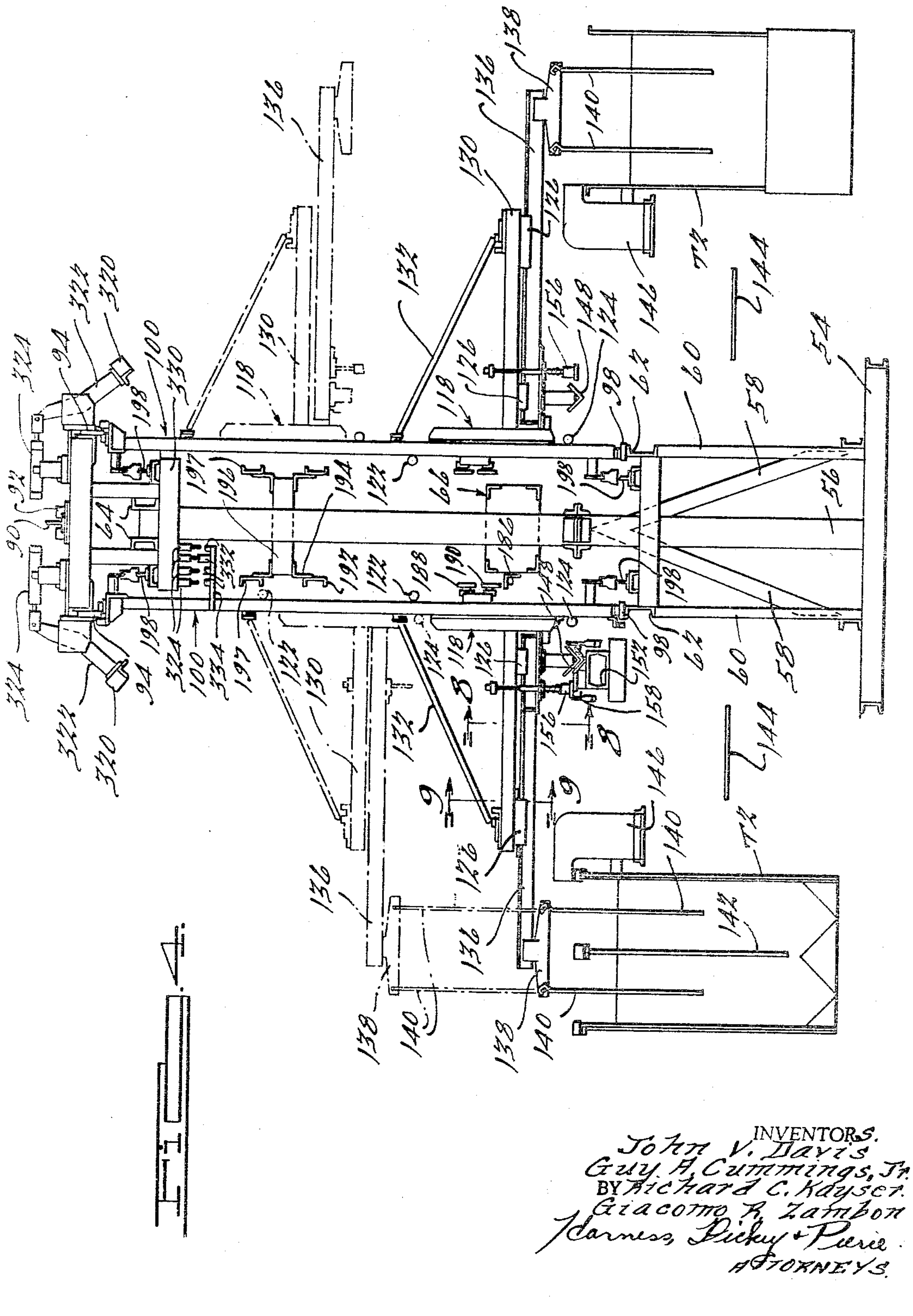
INVENTORS.
John V. Davis
Guy A. Cummings, Jr.
BY Richard C. Kayser
Giacomo R. Zambon
Harness, Dickey + Pierce
ATTORNEYS.

INVENTORS.
John V. Davis
Guy H. Cummings, Jr.
BY Richard C. Kayser
Giacomo R. Zambon
Harness, Dickey & Pierce
ATTORNEYS.

INVENTORS.
John V. Davis
Guy R. Cummings, Jr.
Richard C. Kayser
Giacomo R. Zambon
BY Harness, Dickey & Pierce
ATTORNEYS.

March 28, 1967 J. V. DAVIS ET AL 3,311,214
CONVEYING MACHINE
Filed Oct. 6, 1964 17 Sheets-Sheet 7
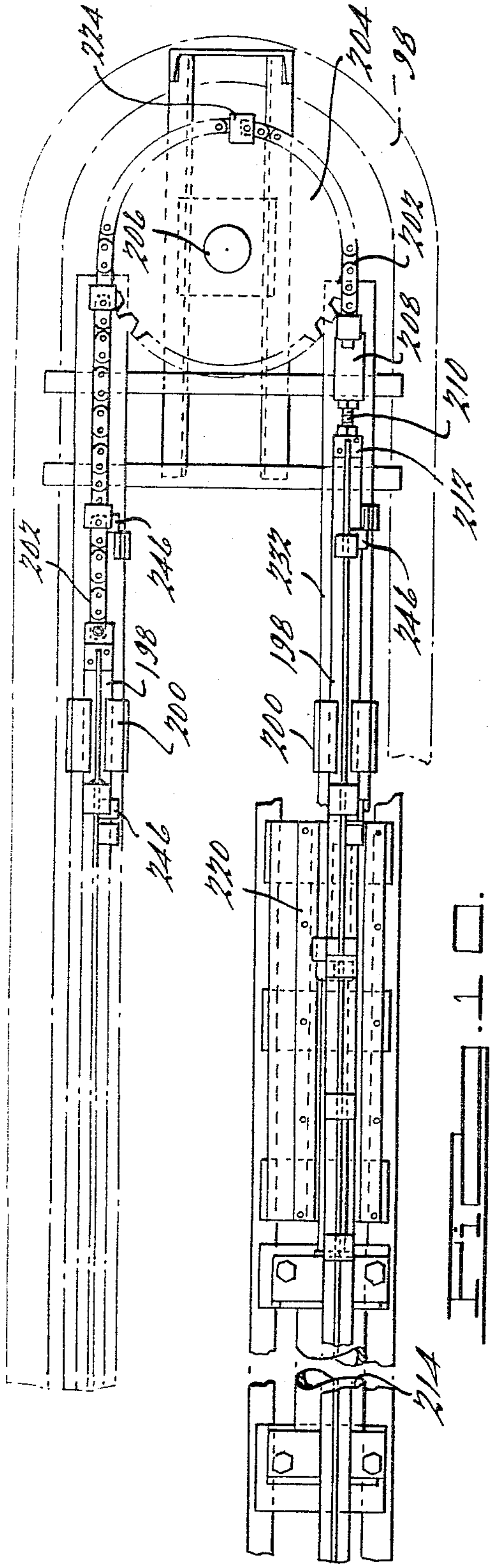
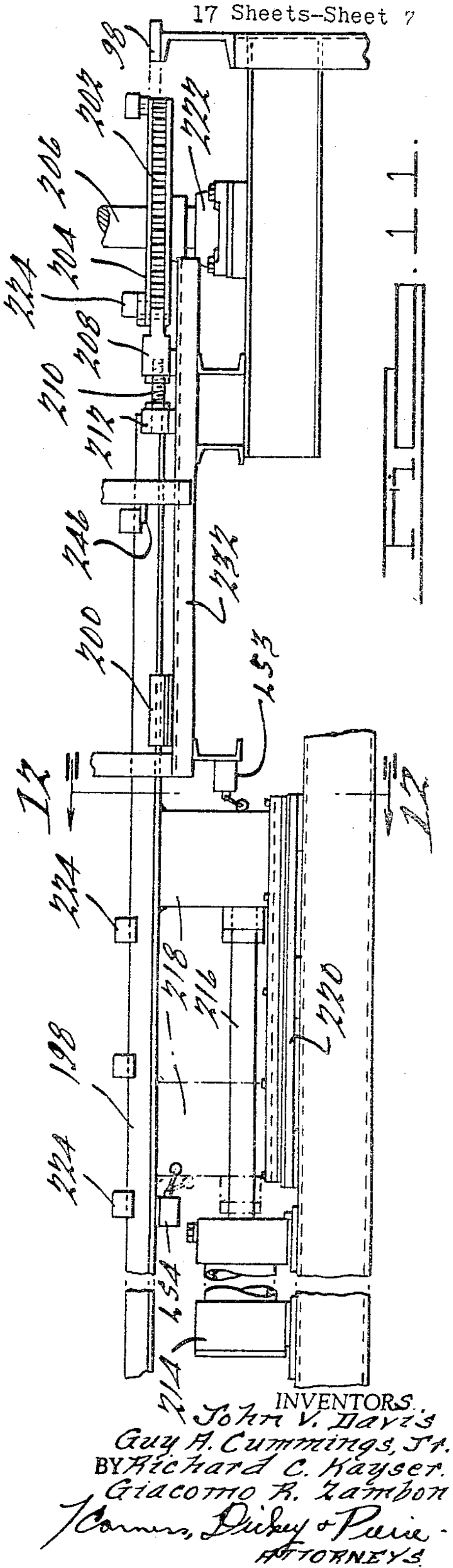
INVENTORS.
John V. Davis
Guy A. Cummings, Jr.
BY Richard C. Kayser.
Giacomo R. Zambon
Connors, Dickey & Pierce
ATTORNEYS INVENTORS.
John V. Davis
Guy H. Cummings, Jr.
Richard C. Kayser
Giacomo R. Zambon
BY Harness, Dickey & Pierce
ATTORNEYS.

March 28, 1967 J. V. DAVIS ET AL 3,311,214

CONVEYING MACHINE

Filed Oct. 6, 1964 17 Sheets-Sheet 9

INVENTORS.
John V. Davis
Guy H. Cummings, Jr.
BY Richard C. Kayser
Giacomo R. Zambon
Harness, Dickey & Pierce
ATTORNEYS.

INVENTORS.
John V. Davis
Guy A. Cummings, Jr.
BY Richard C. Kayser
Giacomo R. Zambon
Harness, Dickey & Pierce
ATTORNEYS.

INVENTORS.
John V. Davis
Guy R. Cummings, Jr.
BY Richard C. Kayser
Giacomo R. Zambon
Harness, Dickey & Pierce
ATTORNEYS March 28, 1967 J. V. DAVIS ET AL 3,311,214
CONVEYING MACHINE
Filed Oct. 6, 1964
17 Sheets-Sheet 12
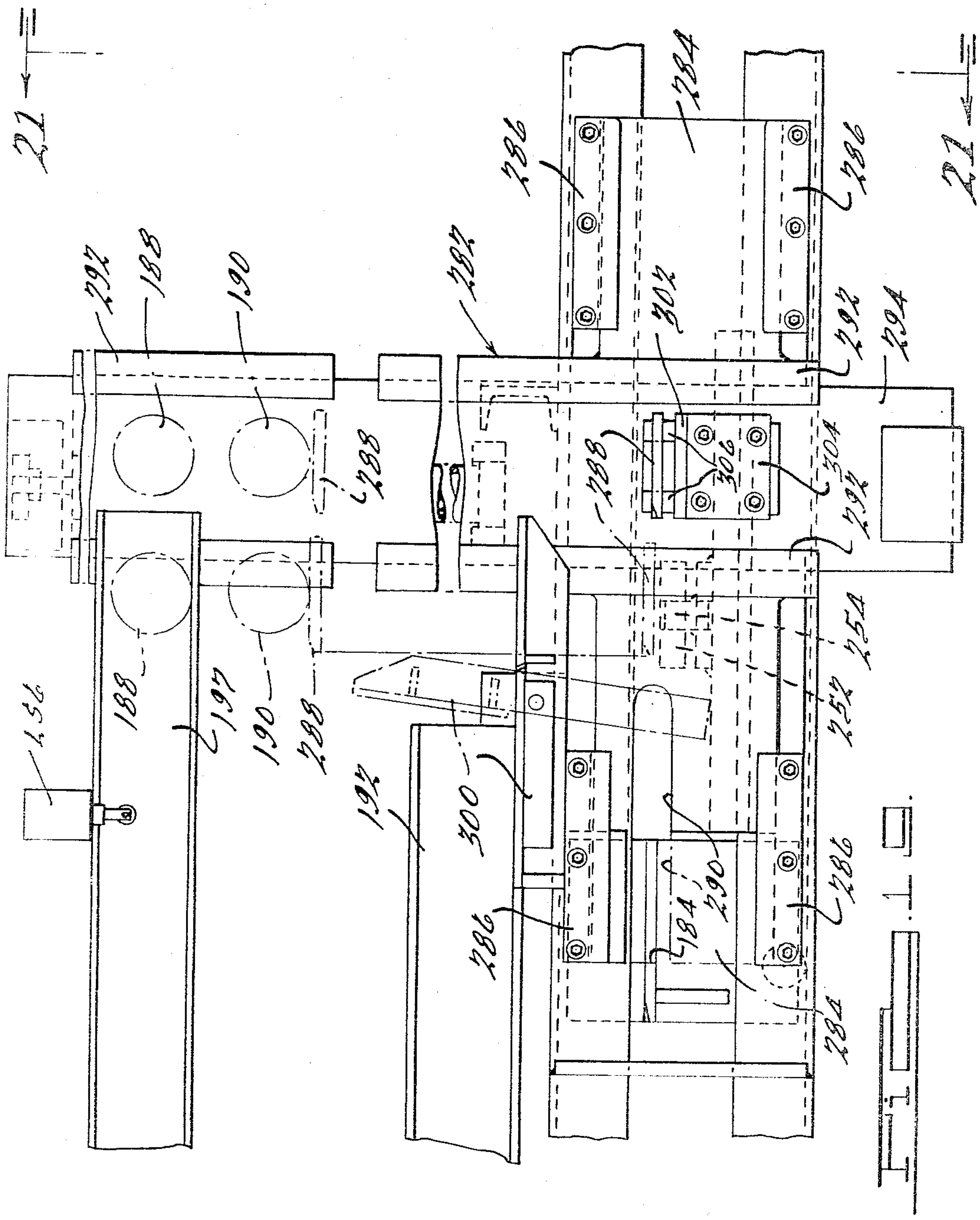
INVENTORS.
John V. Davis
Guy A. Cummings, Jr.
BY Richard C. Kayser
Giacomo R. Zambon
Harness, Dickey & Pierce
ATTORNEYS.

March 28, 1967 J. V. DAVIS ET AL 3,311,214

CONVEYING MACHINE

Filed Oct. 6, 1964 17 Sheets-Sheet 13

INVENTORS.
John V. Davis
Guy A. Cummings, Jr.
BY Richard C. Kayser
Giacomo R. Zambon
Barnes, Dulay & Pierce
ATTORNEYS.

INVENTORS
John V. Davis
Guy A. Cummings, Jr.
BY Richard C. Kayser
Giacomo R. Zambon
Harness, Dickey & Pierce
ATTORNEYS.

March 28, 1967 J. V. DAVIS ET AL 3,311,214

CONVEYING MACHINE

Filed Oct. 6, 1964 17 Sheets-Sheet 15

INVENTORS.
John V. Davis
Guy H. Cummings, Jr.
BY Richard C. Kayser
Giacomo R. Zambon
Barnes, Dickey & Pierce
ATTORNEYS.

March 28, 1967 J. V. DAVIS ET AL 3,311,214

CONVEYING MACHINE

Filed Oct. 6, 1964

17 Sheets-Sheet 16

INVENTORS.
John V. Davis
Guy A. Cummings, Jr.
BY Richard C. Kayser
Giacomo A. Zambon
Harness, Dickey & Pierce
ATTORNEYS.

INVENTORS.
John V. Davis
Guy A. Cummings, Jr.
BY Richard C. Kayser
Giacomo A. Zambon
Harness, Dickey & Pierce
ATTORNEYS.

3,311,214
CONVEYING MACHINE

John V. Davis, Grosse Pointe Farms, Guy A. Cummings, Jr., Dearborn, Richard C. Kayser, Mount Clemens, and Giacomo R. Zambon, Warren, Mich., assignors to The Udylite Corporation, Warren, Mich., a corporation of Delaware

Filed Oct. 6, 1964, Ser. No. 401,836
19 Claims. (Cl. 198—19)

The present invention broadly relates to a conveying apparatus and more particularly to an improved conveying machine for automatically conveying workpieces through a preselected sequential treating cycle. More specifically, the present invention is directed to an automatic conveying machine incorporating a plurality of laterally extending supporting arms from each of which one or more workpieces are suspended and are conveyed thereon from one treating station to next successive treating stations, and the workpieces are periodically elevated to enable their transfer over intervening obstructions.

Automatic conveying apparatuses of the aforementioned type are particularly applicable for conveying workpieces mounted on work racks through a sequential chemical, electrochemical, electroplating, or the like, process, in which the workpieces are subjected to a prescribed treatment at each of a plurality of treating stations. Conveying machines of the so-called "arm" type are characterized by their incorporation of a plurality of laterally extending work-supporting arms from which the work racks are suspended and are conveyed by the arms through the treating sequence. While conveying machines of the so-called "arm" type are particularly suitable for use in connection with several treating processes, machines of this type heretofore known have been subject to several inherent disadvantages which have detracted from a more widespread use thereof. One inherent disadvantage of arm-type conveying machines of the types heretofore known is the fixed spacing between each of the arms from which the work racks are suspended, necessitating a corresponding constant distance between each of the treating stations extending along the path of travel of the work-supporting arms. In electroplating operations, for example, the inflexibility of a constant rack spacing constitutes a significant disadvantage since it is frequently desirable to vary the distances between adjacent work racks in order to achieve optimum treatment of the surfaces of the workpieces being processed. In long multiple-station treating receptacles, it is feasible in many instances to space the work racks at relatively small increments, achieving thereby optimum plating and at the same time reducing the length of the receptacle and conserving the quantity of expensive treating solution required. On the other hand, it is desirable to increase the spacing between adjacent work racks at single-station receptacles in order to avoid any possible interference between the workpieces and the side walls of the treating receptacle, as well as any anodes or other equipment present in the receptacle. It will be apparent from the foregoing that in arm-type conveying machines of the types hereinbefore known, the minimum permissible rack spacing of any specific treating station is of necessity adopted as a standard for the balance of the treating stations, resulting thereby in a substantial and unnecessary increase in the size of the machine and in the length of travel of the work carries which results in greater machine cost and less efficient utilization of plant space.

Further inherent problems present in arm-type conveying machines of the types heretofore known has been the difficulty of providing suitable mechanical agitation devices for effecting relative movement of the work racks when immersed in the treating solutions, due to the complexity of the machine structure on which the work-supporting arm is mounted. Machines of this general type theretofore known have also been deficient in the flexibilty and versatility to adapt them to preselected variations in the standard processing sequence whereby individual work carrier arms and the work racks suspended therefrom undergo a cycle selectively different from the standard cycle of the remaining work carrier arms. There has also been a need for means to place all or selected ones of the work carrier arms in a storage position, facilitating machine startup and shutdown as well as inactivating selected ones of the work carrier arms as desired.

It is accordingly a principal object of the present invention to provide an improved arm-type conveying machine which overcomes the problems and disvantages associated with machines of similar type heretofore known.

Another object of the present invention is to provide an improved arm-type conveying machine in which each of the work carrier arms are independently and movably supported on the guide rails and are advanced through selectively different increments, providing therewith a variable spacing of the work racks supported therefrom resulting in a decrease in size of the machine required and a more efficient utilization of plant space and treating solutions.

Still another object of the present invention is to provide an improved arm-type conveying machine in which each of the independently movable work carrier arms are locked in position at a treating station, preventing inadvertent movement thereof until the next transfer movement.

A further object of the present invention is to provide an improved arm-type conveying machine in which each of the work carrier arms are reciprocable in a lateral direction, providing for increased simplification in the means for effecting selective agitation of the work racks suspended therefrom.

A still further object of the present invention is to provide an improved arm-type conveying machine of a versatile construction which permits comparatively simple modification thereof to permit a change in its automatic processing cycle as may be required from time-to time, thereby substantially reducing the labor and downtime of the machine for effecting the conversion.

Yet another object of the present invention is to provide an improved arm-type conveying machine which includes simple means that are selectively actuable for retaining all or selected ones of the work carrier arms in a storage position, thereby substantially facilitating startup and shutdown operations of the machine, as well as selectively inactivating certain ones of the work carrier arms for repair and servicing as may be required from time to time without interfering with the operating efficiency of the remaining work carrier arms.

Another object of the present invention is to provide an improved arm-type conveying machine incorporating latching means on each of the work carriers which are selectively operable to effect retention of the work-supporting arm in a raised position for a selected number of treating stations, providing thereby a selective dip and skip operation of certain ones of the work racks.

Still another object of the present invention is to provide an improved arm-type conveying machine which is of simple and compact construction, of versatile and durable operation, of simple control, and of economical manufacture and use.

The foregoing and other objects and advantages of the present invention are achieved by a conveying machine comprising a frame having an elevator chassis movably mounted thereon and movable to and from a raised position and a lowered position. A pair of vertically spaced rails are mounted on the frame, between which a plurality of work carriers are mounted for independent movement therealong. Reciprocatory pusher means are provided for engaging the work carriers effecting intermittent advancement thereof along the rails. A work-supporting arm is mounted on each of the work carriers and is selectively engageable by suitable engaging means on the elevator chassis, effecting sequential lifting and lowering of the work carrier arms in response to the ascending and descending movement of the chassis and thereby enabling the work racks suspended from the work carrier arms to be conveyed above intervening partitions separating adjoining treating receptacles. Latching means are provided on the work carrier which are selectively movable to and from an engaging position in which the work carrier arm is engaged thereby and retained in an elevated position and an inoperative position in which the work carrier arm is raised and lowered in response to the elevator chassis. Cam means are provided which are selectively actuable for moving the latching means between the engaging and non-engaging position. In accordance with an alternative embodiment of the present invention, a storage lift mechanism is incorporated on the chassis and is movable therewith for effecting elevation of the work carrier arm above the normal elevated position in which it is selectively retained for all or a portion of its travel along the treating stations.

Other objects, features and advantages of the present invention will become apparent from the subsequent description and the appended claims, taken in conjunction with the accompanying drawings, in which:

FIGS. 2 and 3 are side elevation views of the left end portion and right end portion, respectively, of an arm-type conveying machine constructed in accordance with the preferred embodiments of the present invention;

FIG. 4 is a transverse section view through the conveying machine shown in FIGURE 3 and taken along the line 4—4 thereof;

FIG. 10 is a fragmentary plan view of the lower right-hand sprocket and pusher assembly for intermittently advancing the work carriers along the supporting rails;

FIG. 11 is a fragmentary side elevational view of the sprocket and pusher assembly shown in FIGURE 10;

FIG. 16A is an enlarged fragmentary cross sectional view of the elevator chassis illustrating a selectively engageable movable lift pad for providing a selective delayed dip operation;

FIG. 16B is a fragmentary enlarged side elevation view of the selectively movable lift pad on the elevator chassis as shown in FIG. 16A;

FIG. 18 is a fragmentary side elevational view partly in section of the power cylinder for effecting longitudinal reciprocation of the slide bars in the elevator chassis;

Referring now in detail to the drawings, and as may be best seen in FIGURE 1, a machine arrangement as illustrated of the so-called return type, in which the work-supporting arms are moved from a load station at the right end of the machine, as viewed in FIGURE 1, in a counterclockwise direction through a plurality of treating stations, and the work racks are subsequently unloaded from the machine such as at a station adjacent to the load station. While the conveying machine comprising the present invention is particularly applicable to machines of the so-called return type in which the workpieces are conveyed in a continuous loop, it will also be appreciated that the principles and construction of the conveying machine are equally applicable to machines of the so-called straight line or straight-through type in which work racks are loaded at one end of the machine and are unloaded at the opposite end thereof. The conveying machine indicated at 50 is disposed centrally of an aligned series of single-station treating tanks T1, and multiple-station treating tanks T2 in which the work racks suspended from the work-supporting arms illustrated in dotted lines at 52, are sequentially immersed. A suitable drip tray or pan 54 is positioned at the left-hand end of the machine, as viewed in FIGURE 1 and extends in arcuate alignment with the treating receptacles disposed along each side of the machine. It will be noted that the work-supporting arms 52 are generally disposed at smaller intervals along the multiple-station tanks T2 and at proportionately larger intervals along the single-station tanks T1.

Figure 1:
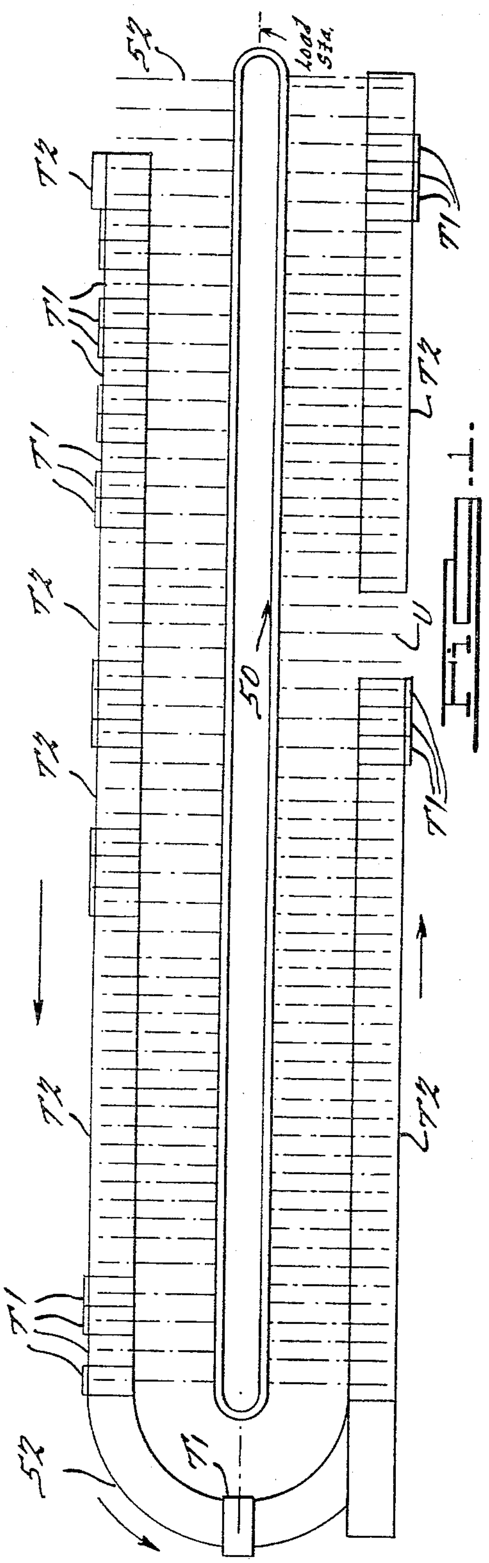
FIGURE 1 is a diagrammatic plan view of a typical arrangement of treating stations extending around a conveying machine through which work racks are sequentially advanced by the arm-type conveying machine comprising the present invention.
Figure 1B:
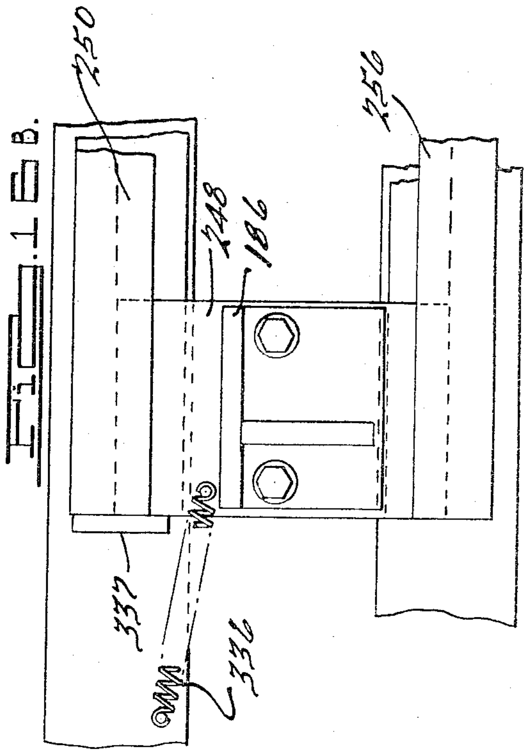
Figure 1A:
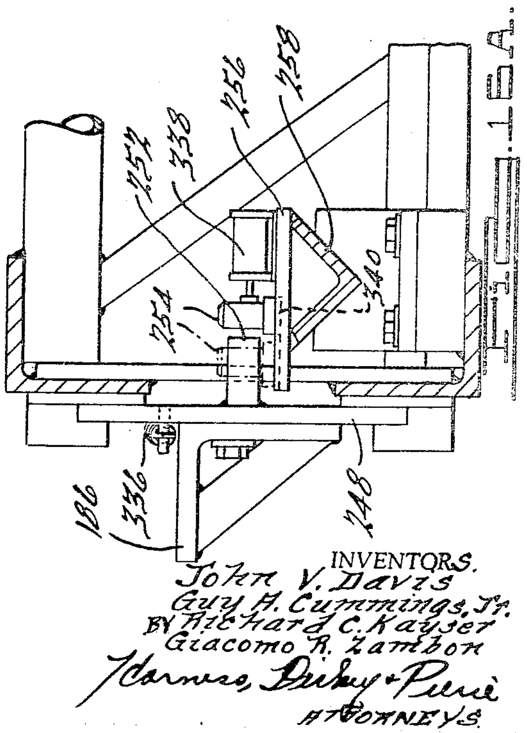

The general arrangement as illustrated in FIGURE 1 is applicable to an electroplating operation in which a copper plating is deposited on the surfaces of the workpieces. For this purpose, commencing at the load station and moving in a counterclockwise direction, the first multiple-station tank T2 may comprise a suitable cleaner tank containing an alkaline cleaning solution and the subsequent single-station tanks T1 may contain suitable acid solutions and rinse solutions to effect proper pretreatment of the surfaces to be electroplated. At the completion of the pretreatment phase along one side of the machine, the work racks may suitably be immersed in a single-station tank T1 positioned at the left end of the machine as viewed in FIGURE 1, containing a de-ionized cold water rinse from which the work racks are transferred in the direction of the arrows to a multiple-station copper plating tank T2. In the multiple-station tanks, the work-supporting arms 52 remain in the lowered position and are intermittently advanced from the input end thereof toward the output end. At the completion of treatment in the multiple-station treating receptacle T2, the work racks are conveyed in the direction of the arrow through three single-station treating receptacles in which the workpieces may suitably be rinsed and thereafter are conveyed to a station generally indicated at U at which, if desired, the workpieces can be unracked for subsequent processing such as buffing and overplating, for example. Thereafter, the workpieces can be reracked to complete the balance of the treating cycle. After station U, the workpieces are again transferred through an after-treatment station comprising a multiple-station tank T2 and single-station tanks T1. Alternatively, the work racks can be unloaded at the station U and only the work racks transferred through the balance of the treating cycle to effect a stripping of any metallic deposition from the work racks prior to their reloading at the load station position at the right-hand end of the machine. The general arrangement of the treating receptacles as hereinabove described is applicable to any one of a variety of electroplating or other treating processes, and the length of the machine can be varied consistent with the specific operation to be performed.

The structure of the conveying machine will now be described with particular reference to FIGURES 2–5. As shown in these figures, the conveying machine 50 comprises a central framework including a base platform 54 on which a plurality of columns 56 are mounted at longitudinally aligned intervals. The columns 56 are suitably braced by angular braces 58, as illustrated in FIGURE 4, which are affixed at their lower ends to upright braces 60 extending upwardly from the platform 54. The upright braces 60 are affixed at their upper ends to longitudinally extending channel members 62. The upper ends of the columns 56 are securely fastened to longitudinally extending channels 64 which provide a base for the upper frame structure of the machine.

Figure 3:
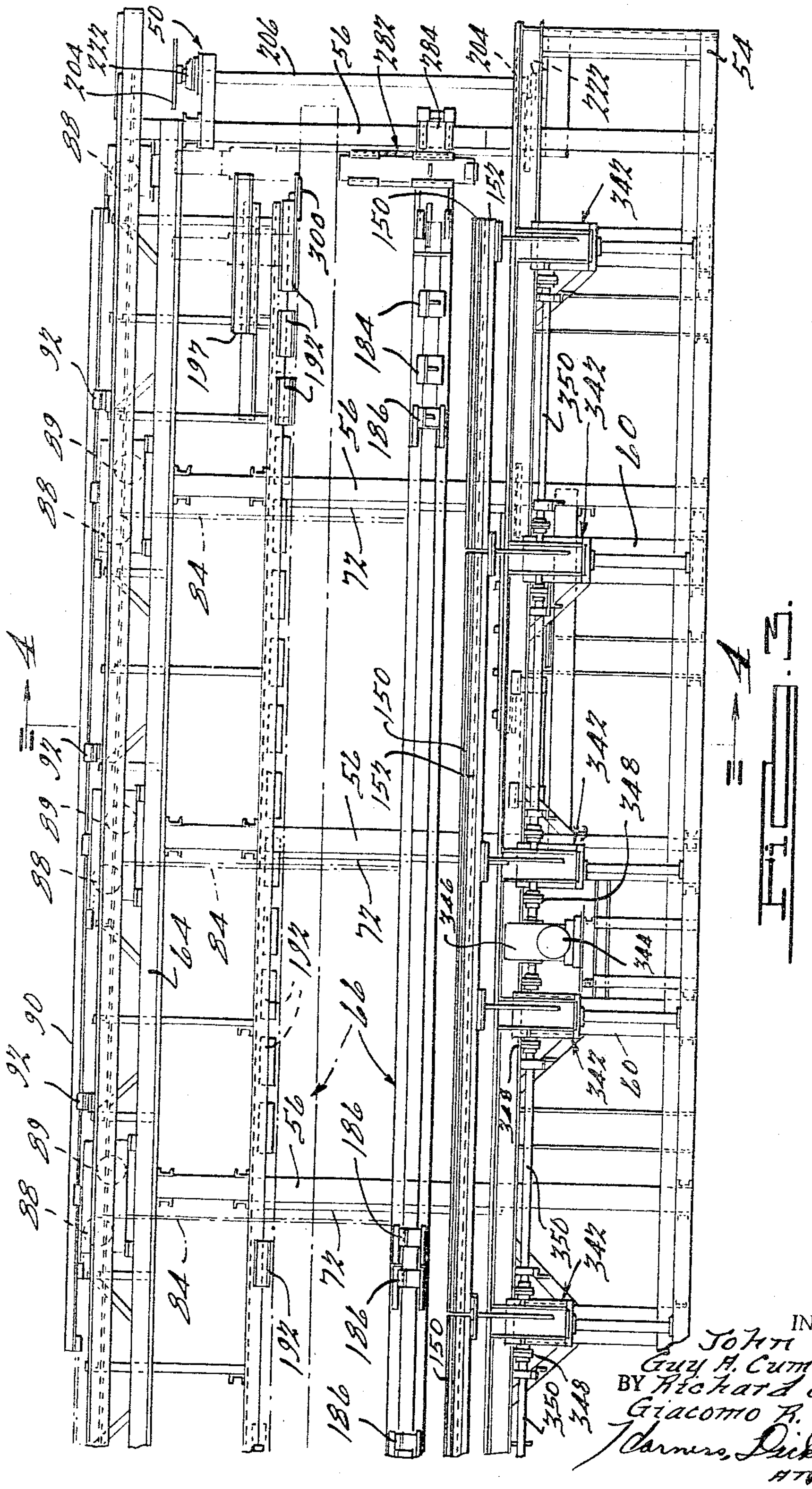
Figures 5, 22:
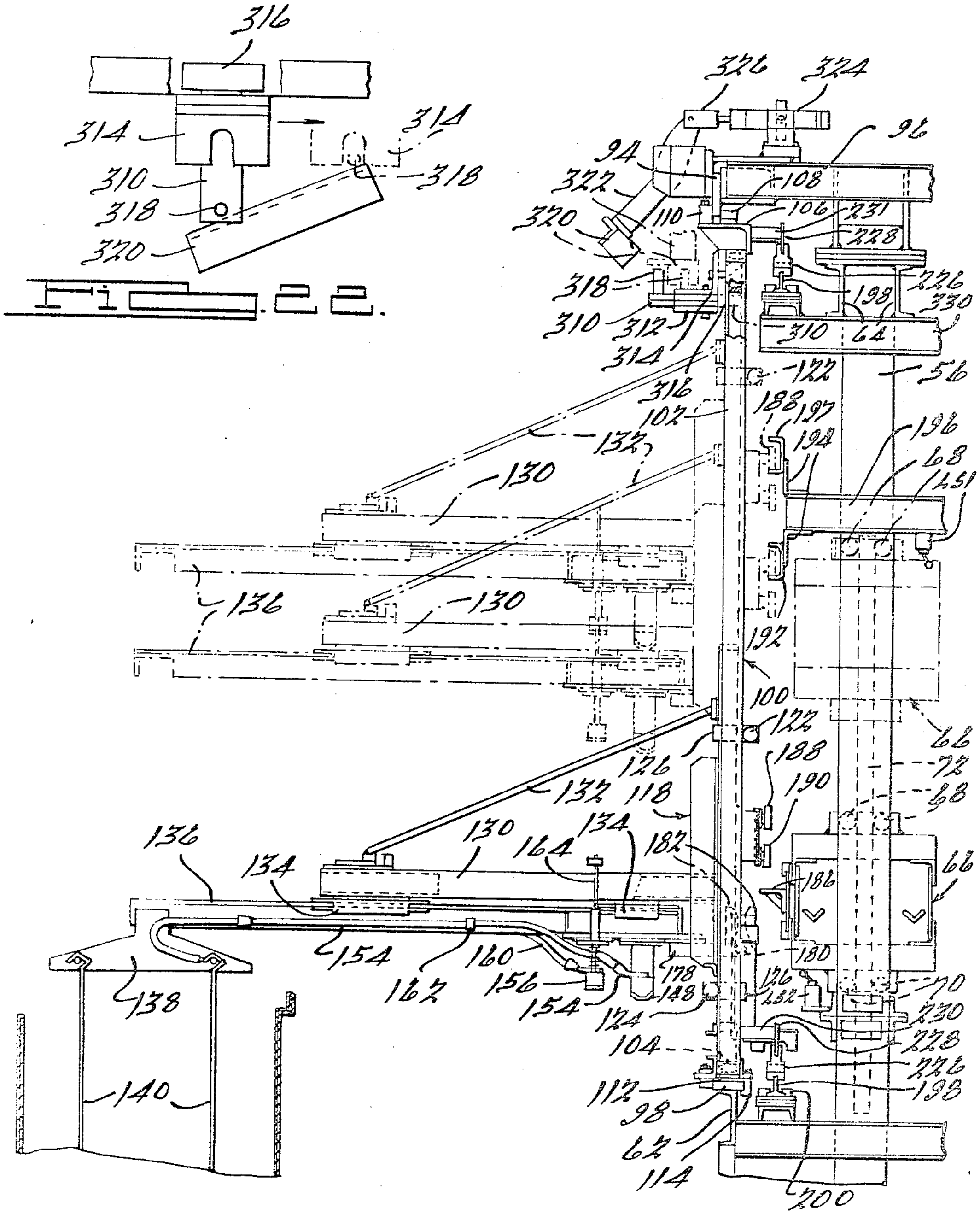
FIG. 5 is an enlarged fragmentary sectional view of the left side portion of the conveying machine as illustrated in FIGURE 4.
FIG. 22 is an enlarged plan view of the latching pin mechanism on the work carrier as shown in FIGURE 5.

An elevator chassis 66 is guidably mounted for up and down movement on the columns 56 and is movable to and from a lowered position, as shown in solid lines in FIGURES 2–5, and a raised position as shown in phantom in FIGURES 2, 3 and 5. The elevator chassis 66, as best seen in FIGURE 5, is provided with upper rollers 68 and lower rollers 70, which are disposed in rolling bearing engagement with a vertical guide rail 72 affixed to one side surface of each of the columns 56. Movement of the elevator chassis 66 to and from the lowered position and the raised position is achieved by suitable power means such as by a double-acting hydraulic lift cylinder 74 as shown in FIGURE 2, which is mounted with the upper blank end thereof affixed to the underside of the channel members 64 of the upper framework. The piston rod end of the lift cylinder 74 is provided with a clevis-type fitting 76 for connecting the piston rod to a crosshead 78 having guide shoes 80 on the vertical side edges thereof. The guide shoes 80 are disposed in sliding guided relationship on a pair of guide rails 82 affixed to opposed surfaces of the center columns 56 of the machine.

The vertical reciprocating movement of the crosshead 78, in response to the actuation of the hydraulic lift cylinder 74, is transmitted to the elevator chassis by means of a plurality of cables or chains 84 which are connected to the upper edge of the crosshead and in turn are trained around a suitable pulley or sprocket assembly 86 rotatably mounted in the upper frame of the machine to each side of the lift cylinder, as best seen in FIGURE 2. One of the lift chains 84 is trained over a sprocket of the sprocket assembly 86 and extends downwardly therefrom and is connected to the upper portion of the chassis 66. The remainder of the lift chains 84 extend out horizontally from the sprocket assemblies 86 in opposite directions and are secured to lift bars 90 which are slidably mounted for longitudinal reciprocation in slide shoes 92 secured to the upper end of the frame, as best seen in FIGURES 2–4. A series of lift chains 84 are connected at longitudinally spaced intervals to the lift bars 90, and the lift chains in turn are trained over similar sprockets 88 and extend downwardly and are connected to the elevator chassis. Accordingly, vertical reciprocation of the piston rod of the lift cylinder 74 effects a corresponding longitudinal reciprocation of the lift bars 90, effecting a vertical movement of the lift chains which in turn is transmitted to the elevator chassis. In accordance with this arrangement, a substantially uniform lifting force is applied along the length of the elevator chasis, avoiding thereby any tendency of the chassis to become misaligned. The elevator chassis may also be connected to suitable counterweights suspended from chains (not shown) which are trained over sprockets 89 rotatably mounted on the upper frame so as to decrease the lifting force required, and further tend to prevent any skewing or misalignment of the chassis during its ascending and descending movements.

It will be understood that alternative satisfactory lift mechanisms can be satisfactorily employed such as, for example, a rack and pinion gear arrangement, an elongated lead screw, a mechanically driven cable system, or the like. In either event, the lifting and lowering movement of the elevator chassis is controlled so that the work-supporting arms are elevated to an appropriate aligned position when in the raised position and to a lowered position wherein the work racks supported therefrom are immersed in the treating solution contained in a treating tank disposed therebelow. Controlled lifting and lowering movement of the elevator chassis can be suitably achieved by means of lift limit switches which are electrically connected by the central control system to suitable valves which control the flow of hydraulic fluid into the blank end and rod end of the lift cylinder.

Figures 6, 7, 8, 9:
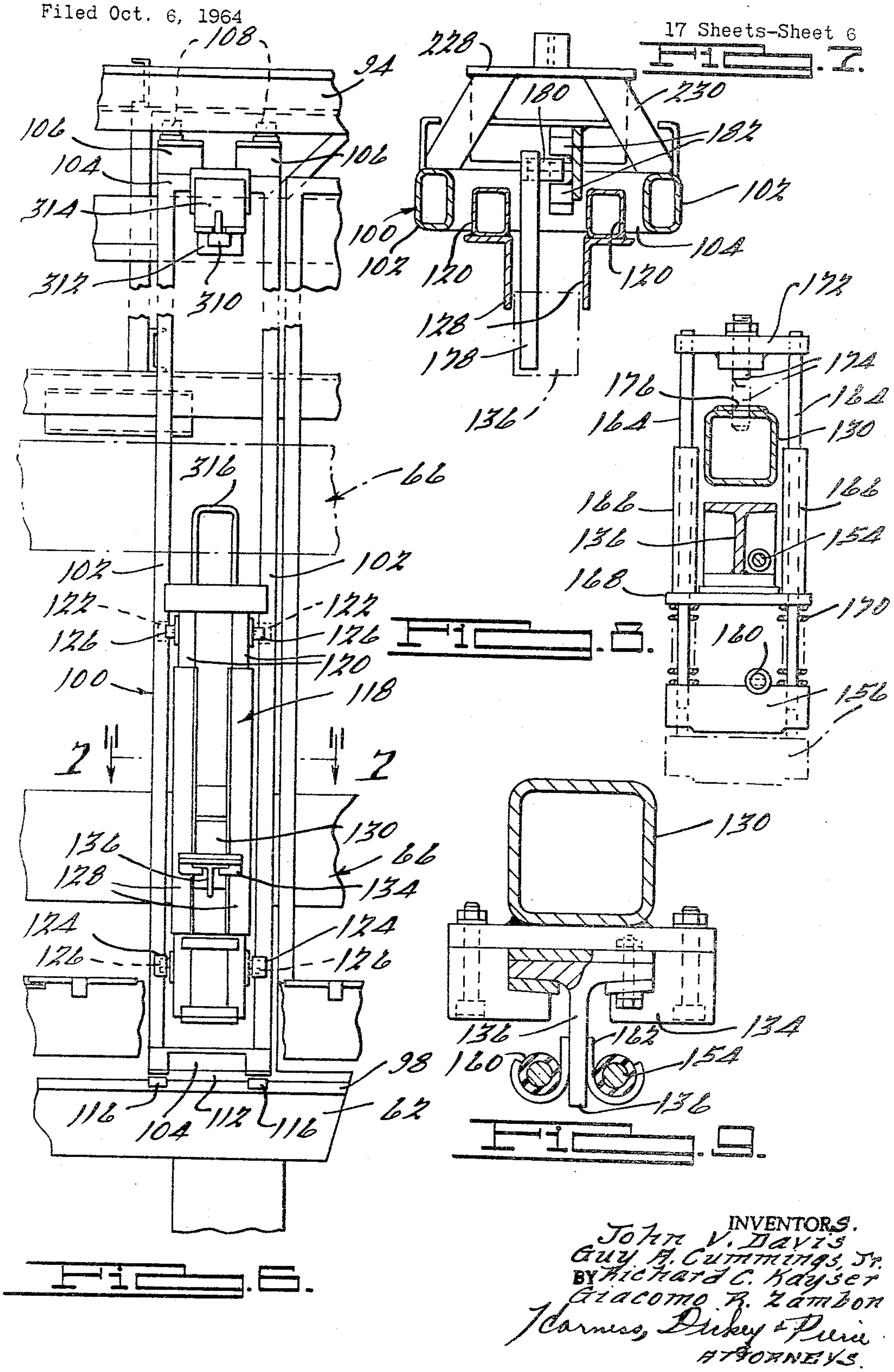
FIG. 6 is an enlarged front elevation view of a work carrier including the carriage frame movably mounted between the supporting rails.
FIG. 7 is a transverse horizontal sectional view through the work carrier shown in FIGURE 6 and taken on the line 7—7 thereof.
FIG. 8 is a vertical sectional view through the work carrier arm illustrating the locking mechanism as shown in FIGURE 4 and taken along the line 8—8 thereof.
FIG. 9 is a transverse vertical sectional view through the work supporting arm as shown in FIGURE 4 and taken along the line 9—9 thereof.

The work-supporting arm is guided for movement in a continuous loop pattern by means of an upper guide rail 94 affixed to the ends of a cross member 96 attached to the upper end of the frame, as best seen in FIGURE 5, and a lower guide rail 98 secured to the upper edge of the channel 62. The upper and lower guide rails 94, 98, each comprising a pair of straight side sections connected by arcuate turn-around sections, extend in a continuous loop around the entire machine and guidably support a carriage frame 100 of each of the work carriers which extends therebetween. The carriage frame 100, as best seen in FIGURES 5–7, comprises a tubular frame comprising a pair of spaced upright guide members 102 which are interconnected at the upper and lower ends thereof by cross members 104. A pair of angle members 106 are affixed to the upper cross member 104 of each carriage frame on which a pair of spaced rollers 108 are rotatably mounted for rolling bearing contact against the lower rearward surface of the upper guide rail 94. In addition, a guide shoe 110 is affixed to the angle members 106 and is disposed in sliding bearing contact against the lower edge of the upper guide rail 94.

Figures 12, 15:
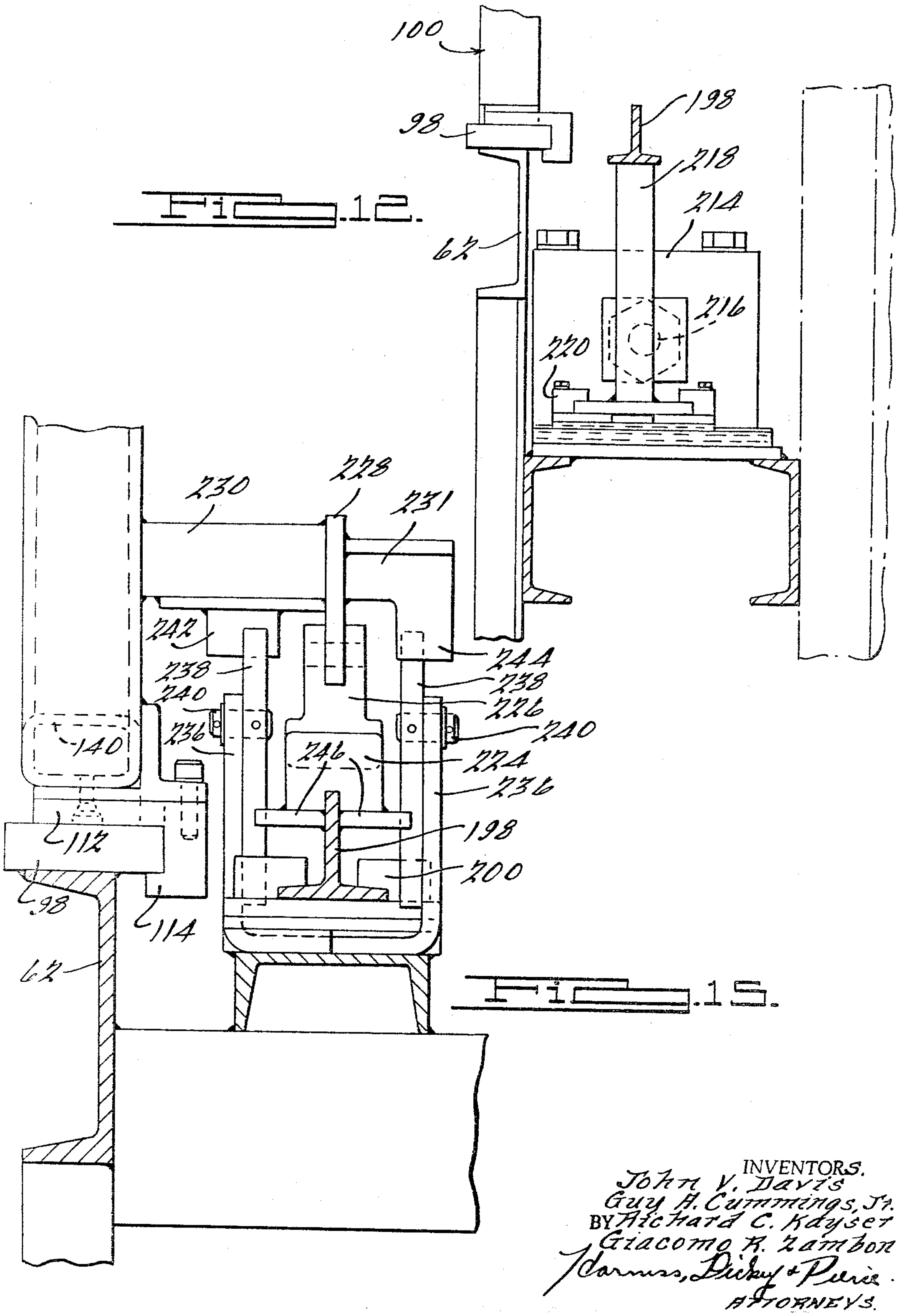
FIG. 12 is a fragmentary vertical sectional view through the pusher mechanism shown in FIGURE 11 and taken along the line 12—12 thereof.
FIG. 15 is a transverse sectional view through the pusher bar as shown in in FIGURE 14, and taken along the line 15—15 thereof.

The lower end of the carriage frame 100, as best seen in FIGURES 5 and 6 and 15, is provided with a slide shoe 112 affixed to the lower cross member 104 which is disposed in sliding bearing contact against the upper surface of the lower guide rail 98. In addition, an engaging pawl 114 is affixed to the rearward side of the cross member 104 of the carriage frame which underlies and engages the rearward edge of the lower guide rail 98. A pair of longitudinally spaced rollers 116 are rotatably mounted on the lower cross member 104 and are disposed in rolling bearing contact against the forward edge of the lower guide rail 98. It will be apparent, in accordance with this arrangement, that the carriage frame 100 is maintained in appropriate upright guided relationship between the upper guide rail 94 and lower guide rail 98 along the straight as well as the arcuate turnaround end sections thereof.

A carriage 118, on which the work-supporting arm is mounted, is guidably disposed between the upright guide members 102 of the carriage frame, and is movable therealong to and from a raised position and a lowered position in response to the lifting and lowering movement of the elevator chassis. The carriage 118, as may be best seen in FIGURES 5, 6 and 7, comprises a pair of upright tubular frame members 120 which are secured together at their upper and lower ends, forming a frame. A pair of upper rollers 122 are rotatably mounted on the upright tubular frame members 120 and are adapted to be disposed in rolling bearing contact against the rearward surface of the upright guide members 102 of the carriage frame. Similarly, a pair of lower rollers 124 are mounted for rolling bearing contact against the forward edge of the upright guide members 102. Guide shoes 126 are also affixed to the upright frame members 120 of the carriage and are disposed in sliding bearing contact with the surface of the upright guide members 102 adjacent and opposite to the upper rollers 122 and lower rollers 124. The coaction between the slide shoes 126 and the upper and lower rollers 122, 124 serves to guidably support the carriage 118 during its ascending and descending movement.

A pair of angle members 128 are affixed to the upright frame members 120 between the projecting flanges of which an arm 130 of a box-shaped cross section is securely fastened. As may be best seen in FIGURE 5, the arm 130 projects outwardly and laterally of the path of travel of the work carriers and is suitably rigidified in a position substantially perpendicular to the plane of the carriage frame 100 by means of braces 132 extending between the outer end of the arm 130 and the upper end portion of the carriage 118. A pair of guide shoes 134, as best seen in FIGURES 5, 6 and 9, are securely fastened to the underside of the arm 130 in which a slide 136 of a T-shaped cross section is slidably disposed for lateral reciprocation relative to the path of travel of the work carriers.

The slide 136, as shown in FIGURE 4, is provided at its outer end with a mounting bracket 138 from which a pair of work racks 140 can be removably suspended. As shown in FIGURE 4, the mounting bracket 138 is disposed in vertical alignment with the treating receptacles such as the multiple-station treating receptacles T2 wherein the work racks 140 are immersed in the treating solution contained therein and in appropriate spaced relationship relative to a central anode indicated at 142. The lower ends of the work racks 140, when the work-supporting arm is in the raised position, are elevated to a position in vertical clearance relationship relative to the side partitions of the single- and multiple-station treating tanks such that transfer of the work carriers from one tank to the next tank can be achieved in an unobstructed manner. It will also be apparent, in accordance with the arrangement as illustrated in FIGURE 4, that the arm-type conveying machine comprising the present invention provides for convenient access to the center portion of the machine for inspection, servicing and for solution replenishment by means of a pair of catwalks 144 which extend along each side of the machine between the central frame and the aligned rows of treating receptacles. Ancillary processing equipment, such as vent hoods 146, can also be readily accommodated for removing vapors adjacent to the upper edge of the treating tanks and for discharge into a central exhaust manifold (not shown).

Figures 25, 26:
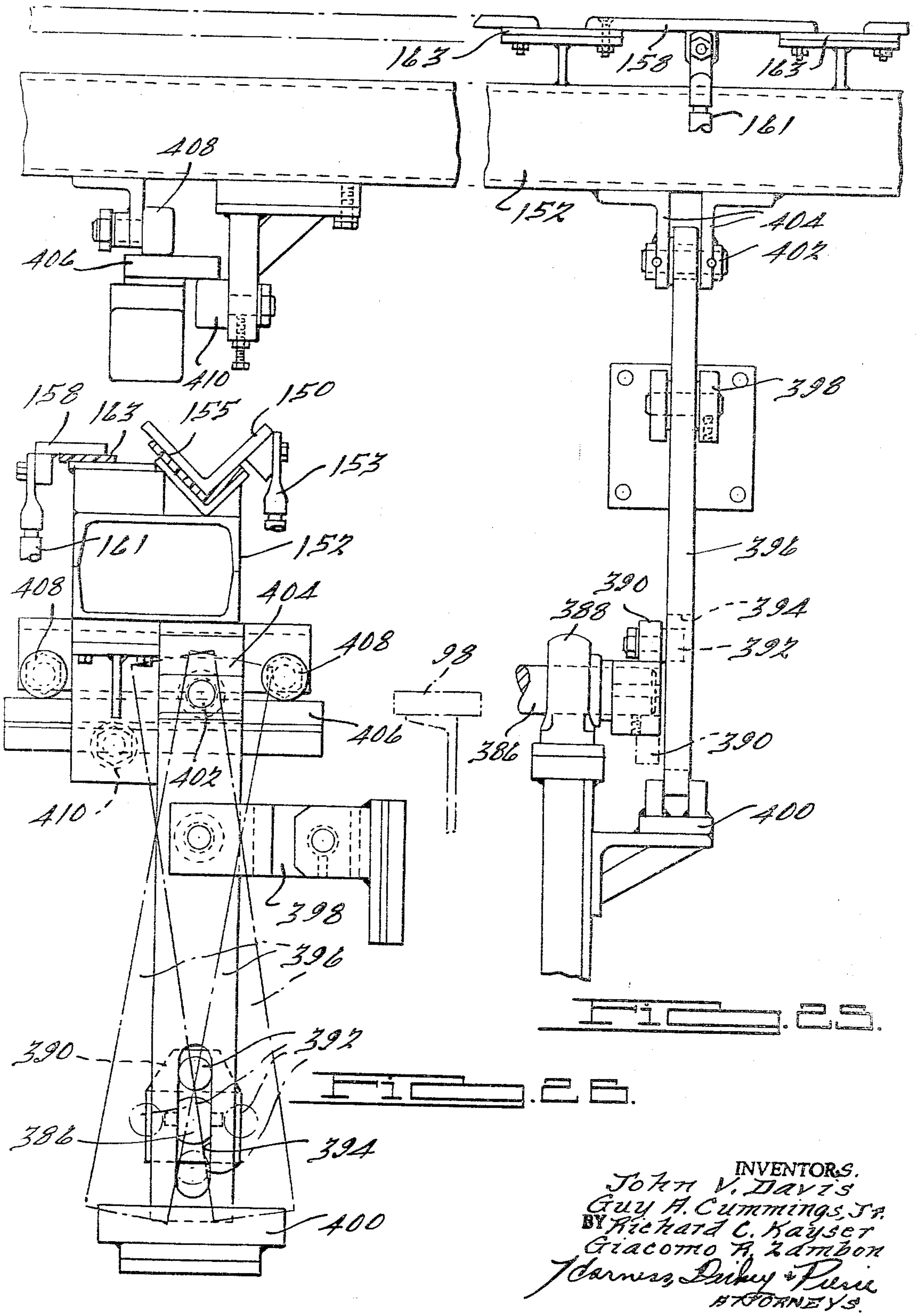
FIG. 25 is an enlarged front elevational view of an alternative horizontal agitation mechanism.
FIG. 26 is a fragmentary side elevational view of the agitation mechanism shown in FIGURE 25, and FIGS. 27 through 31, inclusive, are diagrammatic front elevation views illustrating a typical operating sequence of the conveying machine for effecting a transfer of the work racks suspended therefrom from one treating station to the next adjoining treating station.

The mounting of the slide 136 for movement relative to the arm 130 of the carriage permits a controlled reciprocating and/or oscillating movement to be applied to the slide, effecting thereby a controlled movement of the work racks supported therefrom providing for agitation of the workpieces while immersed in a treating solution. For this purpose, the slide 136 of each work carrier is provided with a downwardly extending contactor formed with a V-shaped pad 148 which is adapted to be disposed in supporting relationship in a complementarily V-shaped support 150 mounted on a box frame 152 which extends along selected portions of the machine, as may be best seen in FIGURES 2, 3 and 4. An appropriate vertical, horizontal, or rotary movement can be applied to the box frame 152, resulting in a corresponding movement of the V-shaped support and the slide 136 in a manner subsequently to be described. The V-shaped support 150 may suitably be connected to an electrical power source such as a cable 153, as shown in FIGURE 26, whereby current is transmitted from the support to the V-shaped pad 148 from which it may suitably be transmitted by means of a cable 154 to one or both of the work racks supported on the mounting bracket, as may be best seen in FIGURES 5 and 9. When the V-shaped support 150 is electrified, as shown in FIGURE 26, suitable insulation pads 155 are disposed between the support and the box frame 152 to prevent electrification thereof. The mounting bracket 138 may suitably be insulated from the slide 136 such that only one or both of the work racks 140 are electrified, while the work-supporting arm assembly and the machine frame are completely insulated therefrom.

Additional electrification of the work racks can be achieved, as desired, by a second contact shoe 156, as best seen in FIGURES 4, 5, 8, 25 and 26, which is adapted to be disposed in electrical contact with a contact pad 158 mounted adjacent to the V-shaped support 150. An electrical conducting cable 160 is connected to the contact shoe 156 and is secured by suitable clips 162 to the side surface of the depending web of the slide 136, as best seen in FIGURE 9. The cable 160 similarly is connected to the mounting bracket 138, as shown in FIGURE 5, for electrifying one or both of the work racks 140 suspended therefrom. At stations where the contact pad 158 is to be electrified, such as by a conductor cable 161 shown in FIGURE 26, an insulating pad 163 is provided to prevent electrification of the box frame 150. It will be appreciated that alternate satisfactory means can be employed for electrifying the workpieces supported on the work racks at those stations at which an electroplating or an electrochemical treatment is to be performed.

The contact 156, as best seen in FIGURES 5 and 8, is supported on a pair of electrically insulated rods 164 which are slidably disposed in a pair of sleeves 166 affixed to a plate 168 secured to the slide 136. The pad 156 is resiliently biased to a downward position, as shown in phantom in FIGURE 8, by means of a pair of coil springs 170 encircling the rod 164 and disposed between the plate 168 and the pad 156. The upper ends of the rods 164 are interconnected by a cross member 172 in which a locking pin 174 is adjustably mounted and is movable to and from a raised position, as shown in solid lines in FIGURE 8, to a lowered position as shown in phantom. In the lowered position, the shank end of the locking pin 174 is disposed in coacting engagement in a bore 176 formed on the upper surface of the arm 130, preventing relative movement between the slide 136 and the arm. The locking pin 174 is continuously biased toward the engaging position by the coil springs 170 such that the slide 136 is locked to the arm 130, preventing inadvertent lateral movement of the slide when the work-supporting arm assembly is in the raised position. Additionally, the engagement of the locking pin 174 with the bore 176 assures that the slide 136 and the work racks suspended from the end thereof are in appropriate vertical alignment relative to the treating receptacles during the subsequent lowering movement of the work-supporting assembly.

Unlatching of the slide 136 from the arm 130 is accomplished in response to the descending movement of the work-supporting arm assembly during the latter portion of which the contact shoe 156 engages the contact pad 158, causing upward movement of the contact from the position shown in phantom to the position shown in solid lines in FIGURE 8, and in opposition to the downward biasing force of the coil springs 170. Disengagement of the slide from the arm occurs just prior to coaction between the V-shaped pad 148 and the V-shaped support 150 which may be in movement so as to impart an oscillating and agitating movement to the slide.

Appropriate lateral alignment of the slide 136 relative to the arm 140 is achieved in response to the ascending movement of the carriage. In accordance with a preferred embodiment of the present invention, a bracket 178, as best seen in FIGURES 5 and 7, is affixed to the inward end of the slide and to which a cam follower or roller 180 is fastened which is adapted to coact with a V-shaped cam 182 mounted on a plate affixed to the lower framework of the carriage frame 100. It will be apparent from this construction that movement of the work-supporting arm assembly from the lowered position, as shown in solid lines in FIGURE 5, toward the raised position effects coaction between the roller 180 and the V-shaped cam 182, appropriately positioning the slide 136 relative to the arm 130 such that the locking pin 174 is in axial alignment with the locking bore 176 in the arm 130 (FIGURE 8).

Movement of the carriage 118 between a lowered position and a raised position is achieved by a series of stationary lifting pads 184 and movable lifting pads 186 affixed to the side surfaces of the elevator chassis as illustrated in FIGURES 2 and 3. The lifting pads 184, 186 are adapted to coact with and engage a roller assembly affixed to the carriage 118 and comprising a lower supporting roller 188 and an upper supporting roller 190, as is best seen in FIGURE 5. The lifting pads are provided along the entire length of the chassis at positions at which the work carrier arm assembly must be raised, including single-station receptacles, the input station and output station of multiple-station treating receptacles, and at such other stations as may be desired for either lifting or lowering the work racks supported on the arm. When the elevator chassis is in the fully lowered position, as shown in solid lines in FIGURE 5, the lower roller 190 on the carriage 118 is disposed above and in clearance relationship relative to a lifting pad such as the lifting pad 186 on the elevator chassis. Accordingly, the entire weight of the work carrier arm is supported either on the two contact pads 148 and 156 when a V-shaped support and/or contact pad is located at the station, or by the carriage frame itself in which position the machine frame supports the load of the workpieces on the arm.

When the chassis is raised to an elevated position, the upper supporting roller 188 is disposed in horizontal alignment with a supporting track section 192, as shown in FIGURE 5, whereupon during the advancing transfer movement of the work carriers, the weight of the work-supporting arm is again supported by the central machine frame. As will be noted in FIGURE 5, the supporting track sections 192 are connected to the depending flange of longitudinally extending members 194 which in turn are fixed to cross members 196 connected at their centers to the upright columns 56. In addition to the supporting track sections 192, suitable storage track sections 197 are also secured to longitudinal members 194 for retaining the work-carrier arms in a raised storage position for the purposes subsequently to be described. The lifting coaction between the elevator chassis and the work carriers will be described in greater detail following a description of the transfer mechanism for intermittently advancing each of the work carriers around the conveying machine frame.

Advancement of the work carriers in a counterclockwise direction, as shown in FIGURE 1, from the load station to the unload station is achieved by a reciprocating pusher or intermittently operable transfer mechanism which is operative to engage the work carrier frame and effect an advancement thereof along the upper and lower guide rails 94, 98. In the exemplary embodiment illustrated in the drawings, each work carrier is simultaneously engaged at its upper and lower ends by an upper and lower transfer mechanism, respectively, so as to apply a uniform transfer force, preventing any skewing or binding of the carriage frame between the upper and lower guide rails. The transfer mechanism comprises a pusher bar 198 of a T-shaped cross section which extends longitudinally along each of the straight side sections of the machine adjacent to and inwardly spaced from the lower guide rail 98 and below and inwardly of the upper guide rail 94 (FIGURE 5). Each of the pusher bars is slidably supported at longitudinally spaced intervals in guide shoes 200 which are affixed to the machine frame. The adjacent ends of the lower pusher bars 198, as best seen in FIGURES 10–15, as well as the ends of the pusher bars disposed in the upper position, are interconnected by means of a transfer chain 202 which extends around and is disposed in engagement with the teeth of a sprocket 204 rotatably mounted on a shaft 206 disposed at the center of curvature of the upper and lower guide rails.

Since the upper and lower pusher mechanisms are essentially identical, only the lower pusher mechanism will be described in detail, which is believed sufficient for a complete understanding of the operation of the machine comprising the present invention. As best seen in FIGURES 10 and 11, one end of the transfer chain 202 is connected to a coupling block 208 which in turn is connected by means of an adjusting screw 210 which is threadably engaged with a second coupling block 212 connected to the end of the pusher bar 198. The adjusting screw 210 permits appropriate adjustment and tensioning of the transfer chain 202 connecting adjacent ends of the pusher bars.

Reciprocation of the pusher bar is achieved by a double-acting transfer cylinder 214, as best seen in FIGURES 10–12, which is affixed to the machine frame below and in longitudinal alignment with the pusher bar 198. The transfer cylinder is provided with a piston rod 216, the end of which is securely fastened to a slide member 218 which is slidably disposed in a guide shoe 220 affixed to the framework of the machine. The slide member 218 is accordingly reciprocable in the guide shoe 220 from a projected or advanced position, as shown in solid lines in FIGURE 11, to a retracted position as shown in phantom in response to the projection and retraction of the piston rod 216. The slide member 218 which is securely affixed to the underside of the pusher bar 198, as shown in FIGURE 11, effects a corresponding reciprocation of the pusher bar and an oscillation of the transfer chain 202 around the sprocket 204. The length of the reciprocating travel of the slide member 218 and the pusher bar is controlled by a forward limit switch LS3, and a rearward limit switch LS4, as shown in FIGURE 11, which are actuated when the pusher bar attains the fully advanced and fully retracted position, respectivley. The limit switches LS3 and LS4 are electrically connected to the central control circuit of the machine and are effective to control the flow of pressurized fluid into the rod end and the blank end of the transfer cylinder through valving in the hydraulic circuit in a manner well known to those skilled in the art. Alternative suitable drive mechanisms, including a rack and pinion arrangement, for example, can be satisfactorily employed in lieu of the hydraulic transfer system hereinabove described.

The reciprocating movement imparted to the pusher bar 198 by the transfer cylinder 214 is transmitted through the transfer chain 202 to the pusher bar on the opposite side. In addition, the sprocket 204 is affixed to the shaft 206 and the oscillating movement thereof effects a corresponding oscillating movement of the sprocket 204 connected to the upper end of the shaft, as best seen in FIGURES 2 and 3, producing a corresponding and synchronized reciprocating movement of the upper pusher mechanism. As will be noted in FIGURES 2, 3 and 11, the end portions of each of the shafts 206 disposed at the ends of the machine, are rotatably supported in bearings 222 secured to the machine framework.

The pusher bar 198 is provided with a series of longitudinally spaced engaging dogs 224 affixed to and projecting upwardly from the upper web portion thereof which are adapted to engage a pivotally mounted pusher 226 depending from a plate 228 affixed to a U-shaped brace 230 affixed to and projecting rearwardly from the lower portion of the carriage frame 100. Engaging dogs 224 are similarly mounted on and connected to adjacent links of the transfer chain by means of pins extending upwardly into the base thereof. The engaging dogs on the transfer chain are disposed at selected intervals for providing appropriate transfer of the work carriers from one station to the next adjacent station. As will be further noted in FIGURES 10 and 11, a longitudinally extending support member 232 is provided adjacent to the sprocket 204 for slidably supporting the base of the coupling block 208 disposed in sliding bearing contact thereon. The coupling 212 connected to the end of the pusher bar 198 is similarly slidably supported on the support member 232.

Figure 14:
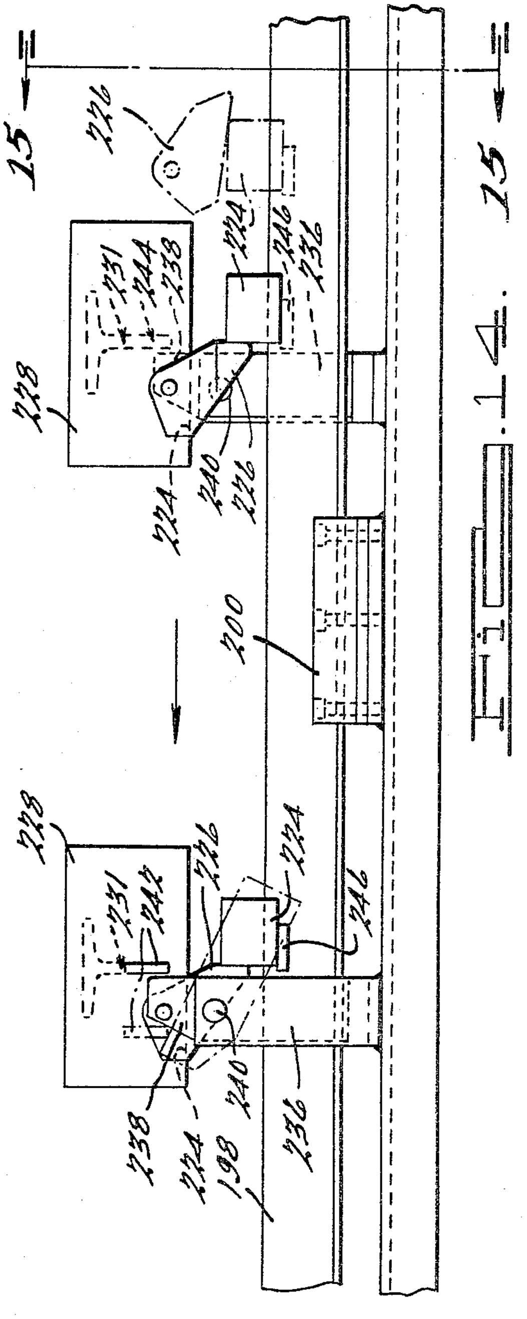
FIG. 14 is a fragmentary side elevational view of the pusher bar and locking devices shown in FIGURE 13.

As previously indicated, the engaging dogs 224 on the lower pusher bars engage the pivotally mounted pushers 226 mounted on the plates 228 connected to the lower ends of the carriage frames. Similarly, the engaging dogs 224 on the upper pusher bars engage pivotally mounted pushers 226, as best seen in FIGURE 5, which depend from plates 228 affixed to T-shaped braces 231 projecting rearwardly from the angle members 106 at the upper end of the carriage frames. As shown in FIGURE 14, the engaging dogs 224 are disposed in engaging relationship with the lower end portion of the pusher 226 whereupon, during the advancing stroke of the pusher bar 198 in the direction of the arrow, the work carrier is advanced from one station to the next adjacent station. The pivotally mounted pusher 226 is mounted so as to pivot from the position shown in solid lines in FIGURE 14 to a position as shown in phantom in response to the retracting movement of the pusher bar, enabling the engaging dog 224 to pass therebelow to a position rearwardly therefrom, preparatory to the next advancing stroke. Pivoting of the pusher during the advancing movement is prevented by the coaction between the lower edge of the plate 228 and a base 234 in the pusher, preventing movement thereof in a clockwise direction, as viewed in FIGURE 14, beyond the engaging position shown in solid lines.

Figure 13:
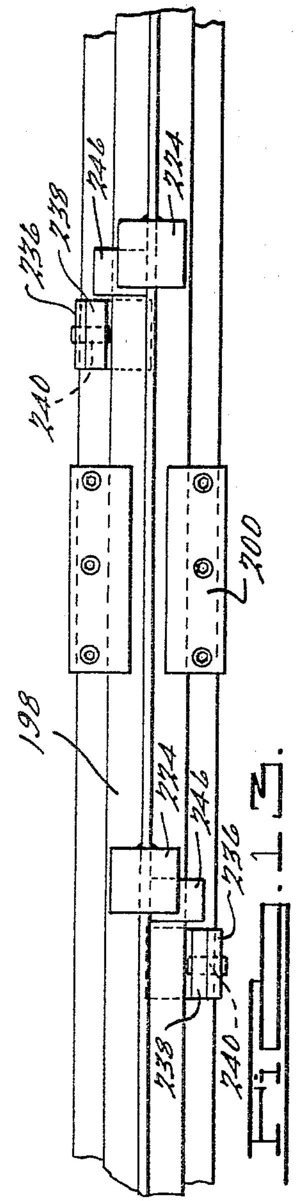
FIG. 13 is an enlarged fragmentary plan view of the pusher bar and the locking devices disposed at spaced intervals therealong.

The pusher bar, as shown in FIGURES 13 and 14, is in the fully advanced position. During the retraction of the pusher bar from the advanced position to the fully retracted position, the engaging dog 224 on the left side, as viewed in FIGURE 14, is retracted to a position occupied by the engaging dog 224 as viewed along the right-end side and behind the pivotally mounted pusher 226 of the preceding work carrier. This relationship permits variations in the total transfer movement of the work carrier from one station to the next station, depending on the fixed spacing on the engaging dogs 224 on the pusher bar 198 in relation to the total length of the reciprocating travel of the pusher bar. The maximum length of travel of the work carriers will be substantially equal to the total length of the advancing stroke of the pusher bar. It is possible, however, to effect a shorter transfer of the work carriers by positioning the engaging dogs 224 at preselected positions on the pusher bar behind a work carrier to be engaged thereby, such that a preselected lost motion occurs with a corresponding reduction in the actual movement of the work carrier. This relationship is exemplified by the position of the engaging dog 224, as shown in phantom, which is disposed rearwardly of the pusher 226 on the right-hand work carrier, as viewed in FIGURE 14. It will be apparent that during the initial advancing movement of the pusher bar, the engaging dog 224 is advanced from the position as shown in phantom to the position as shown in solid lines adjacent thereto, during which the work carrier remains stationary. This lost motion provides for a selective reduction in the total transfer movement of the work carrier. When the engaging dog completes its lost-motion movement, it is disposed in engaging abutting relationship relative to the pusher 226 and, thereafter, during the remaining portion of the advancing stroke, the work carrier is advanced to the next station. It will be apparent from the foregoing that by controlling the total advancing stroke of the pusher bar in relationship to the disposition of the engaging dogs on the pusher bar relative to the pushers on the work carriers, appropriate variations can be achieved in the length of transfer movement and in the distance between treating stations around the entire length of the machine. This variable spacing feature constitutes a significant advantage in enabling optimum utilization of the treating stations.

The variable spacing feature, as hereinbefore described, is made possible by virtue of the independent movement of each of the carriage frames on the guide rails. In order to avoid any inadvertent shifting movement of the carriage frame on the guide rails during the treatment of the workpieces suspended from the work-supporting arms, suitable locking means are provided for latching the work carrier at a substantially fixed position corresponding to the position of the work carrier at the completion of the advancing movement. The carrier locking device, as illustrated in the exemplary embodiment shown in FIGURES 13–15 comprises a series of L-shaped members 236 which are alternately disposed at opposite sides of the pusher bar at a position corresponding to the end of the transfer movement of the work carrier. A pivot member 238 is pivotally supported by means of a pin 240 along the inner face of each L-shaped member 236 and is normally free to pivot in a clockwise and counterclockwise direction.

The upper end of the pivot member 238 projects upwardly beyond the L-shaped member 236 and is disposed in obstructing alignment with a downwardly depending tab 242 affixed to the U-shaped brace 230, as best seen in FIGURE 15, or, alternately, with a tab 244 extending downwardly from the T-shaped brace 231 projecting rearwardly from the plate 228. The lower end of the pivot member 238 is disposed in obstructing alignment with the projecting edge of an ear 246 affixed to the upstanding web of the pusher bar and to the engaging dog 224 mounted thereon. It will be noted that the ears 246 alternately project from opposite sides of the pusher bar, as best seen in FIGURE 13, so as to engage the trailing edge of the pivot member 238 when the pusher bar is in the fully advanced position. The ears 246 are of a length so as not to conflict with the edge of the L-shaped members 236.

The locking relationship of the latching mechanism will now be described with the pusher bar in the fully advanced position, as shown in FIGURES 13–15. In the position as shown, the engaging dogs 224 are disposed in firm abutting relationship against the depending end of the pivotally mounted pushers 226, preventing rearward movement of the work carriers. The upper trailing edge of the pivot member 238 in the left-hand portion of FIGURE 14 is disposed in abutting engagement against the tab 242, tending to pivot the pivot member in a counterclockwise direction, as viewed in FIGURE 14. Pivoting of the pivot member 238 in a clockwise direction is prevented by the abutting engagement of the ear 246 against the lower trailing edge portion of the pivot member 238. At the same time, the pivot member illustrated in the right-hand portion of FIGURE 14 is engaged at its upper end by the tab 244 and at its lower end by the ear 246, as shown in dotted lines.

Accordingly, the work carriers are prevented from moving further beyond the advanced position by the abutting restriction of the pivot member 238 against the tab 242, as in the case of the locking mechanism as viewed in the left-hand portion of FIGURE 14, or the tab 244 of the locking mechanism illustrated in the right-hand portion of FIGURE 14. The work carriers accordingly remain locked in appropriate position until the pusher mechanism is retracted, in which condition the engaging dog 224 and the ear 246 are withdrawn from blocking relationship relative to the pivot member 238. Subsequent advancement of the work carrier is permitted, since the ear 246 of the engaging dog in the left-hand porton of FIGURE 14 extends outwardly in a direction to the side opposite that of the pivot member 238 mounted adjacent to the work carrier along the right end of FIG. 14. Accordingly, during the advancing movement of the pusher bar, both pivot members are permitted to freely pivot in response to contact with the tabs 242 or 244, as the case may be, from the position as shown to the position shown in phantom at the left in FIGURE 14. After the work carrier passes, the pivot members 238 assume the vertical position by gravity and are engaged by the depending tabs and the ears 246 projecting from the pusher bar, maintaining the next work carrier locked in that position for the duraion of the treating cycle at that treating station.

Figure 16:
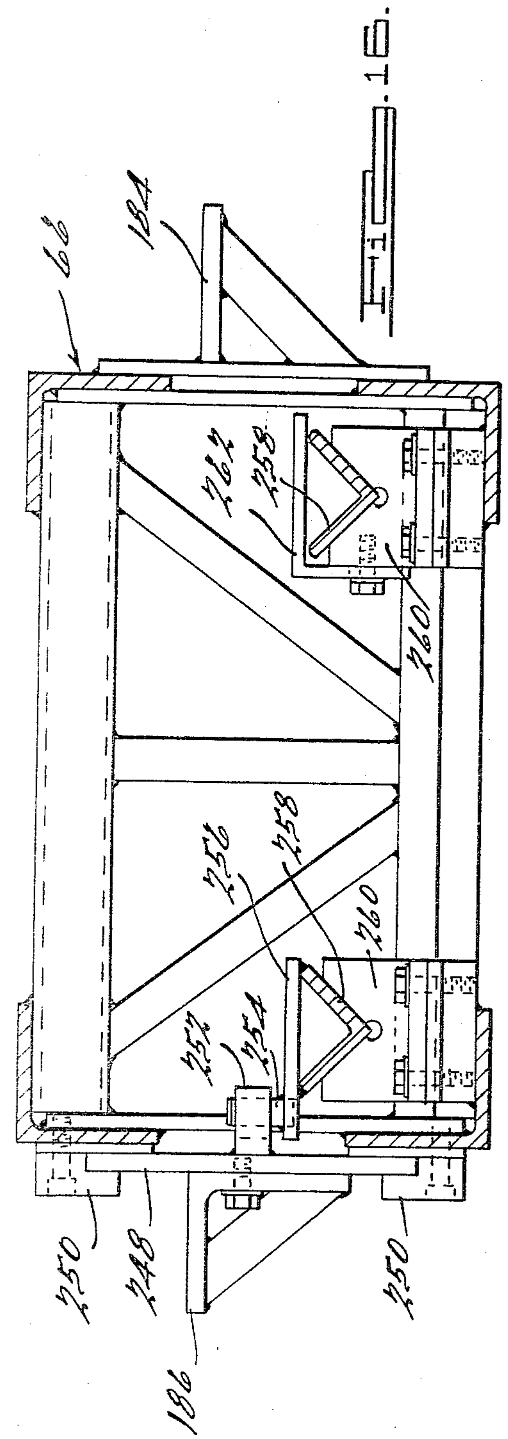
FIG. 16 is an enlarged fragmentary cross sectional view of the elevator chassis illustrating a fixed lifting pad and a longitudinally movable lifting pad.

As hereinbefore set forth, the movable lifting pads 186 are provided at those treating stations at which a work-supporting arm is either moved from a raised position to a lowered position and thereafter remains in the lowered position for one or more subsequent treating stations, or wherein a work-supporting arm which is advanced in the lowered position is lifted out of a treating station to a raised position. This condition corresponds to the input station and output station, respectively, of a multiple-station treating receptacle. At the input station of a multiple-station treating receptacle, for example, the movable lifting pad must be positioned in appropriate alignment to receive the lower supporting roller 190 as the work carrier is advanced to the station in a raised position, at which time the upper supporting roller 188 passes beyond the end of a supporting track section 192. After the chassis is lowered, depositing the work-supporting arm at the first station of a multiple-station treating receptacle, the movable lift pad must be rendered inoperative in order that the work carrier arm remains in the lowered position when the elevator chassis is again raised. Movement of the movable lifting pad to and from an operative and inoperative position is achieved in accordance with the conveying apparatus comprising the present invention by longitudinally reciprocating the lift pad 186 from a position in vertical alignment with the supporting rollers to a position longitudinally spaced therefrom in which it is in clearance relationship relative to the supporting rollers projecting from the rearward side of the carriage. This is achieved, as may be best seen in FIGURES 2, 3 and 16–18, by mounting the movable lift pads 186 on a slide plate 248, the upper and lower longitudinal edges of which are slidably disposed in slide shoes 250. A bifurcated engaging member 252, as best seen in FIGURE 16, is affixed to the slide plate 248 and projects rearwardly therefrom and is disposed in engagement with a pin 254 projecting upwardly from a pad 256 securely fastened to the upper edges of an angle-shaped drive member 258 extending longitudinally along each side of the elevator chassis 66. The drive member 258 is slidably supported at longitudinally spaced intervals in guide shoes 260 formed with a V-shaped groove at the upper end thereof for slidably receiving the drive member. A suitable L-shaped retaining member 262 overlies the upper edges of the drive members 258 at longitudinally spaced intervals, preventing undesirable vertical movement thereof relative to the guide shoes 260.

Figure 17:
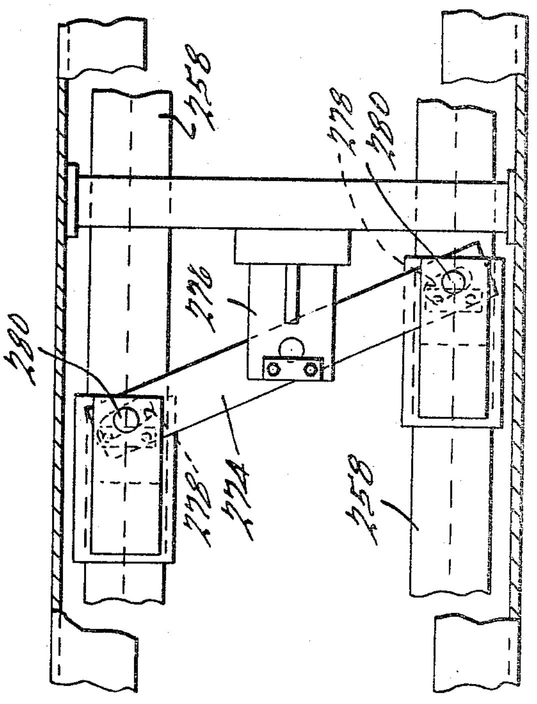
FIG. 17 is a fragmentary plan view of a walking beam linkage for interconnecting adjacent slide bars effecting mutual reciprocation thereof in opposite directions.

Longitudinal reciprocation of the drive members 258 through a controlled travel and in opposite directions is achieved by a double-acting fluid-actuated cylinder 264, as best seen in FIGURE 18, having its blank end pivotally connected to a cross brace 266 and the end of its piston rod 268 pivotally connected to a mounting bracket 270 secured to the upper surface of one of the drive members 258. The length of reciprocating travel of the drive members 258 is suitably controlled by a limit switch LS5 mounted on a longitudinal brace of the elevator chassis, which is adapted to be actuated by actuators 272 affixed to the underside of the drive member and are movable therewith to and from an advanced position and a retracted position. The rceiprocating travel of one of the drive members 258 is transmitted to the drive member 258 on the opposite side of the elevator chassis 66 by a walking beam 274, as best seen in FIGURE 17, which is pivotally mounted at its center to a bracket 276 affixed to the elevator chassis framework. Each of the ends of the walking beam 274 is provided with an elongated slot 278 which is disposed in engaging relationship with a pin 280 affixed to and projecting upwardly from each of the drive members 258. Accordingly, actuation of the double-acting cylinder 264 effects a controlled reciprocation of the drive member 258 connected to the piston rod end thereof which, in turn, is transmitted to the drive member on the opposite side of the chassis though the walking beam 274, effecting reciprocation thereof in an opposite direction through a substantially equal increment. The reciprocating travel of each of the drive members 258 effects a corresponding travel of each of the movable lift pads 186 connected thereto at selected points therealong for movement to and from an operative lifting position to an inoperative position.

It is frequently desirable in machines of the type comprising the present invention to position the work-supporting arms in a storage position in which the arm remains elevated throughout the course of its travel around the treating stations. This is particularly desirable during the startup and shutdown of the machine, as well as for enabling repair or service of one or more of the work-supporting arms as may be required from time to time. In some instances, it is desirable that the storage position of the work-supporting arm be located at an elevation above the normal raised position of the arm during transfer over an intervening tank partition. A storage position of the work-supporting arm above that of the normal raised position of the arm is illustrated in phantom in FIGURES 4 and 5 and in which position the upper supporting roller 188 is disposed in horizontal alignment with storage track sections 197. Elevation of the work-supporting arm and carriage from the normally raised position, as shown in phantom in FIGURE 5, to a storage position as shown in phantom immediately thereabove, is achieved by a storage lift mechanism 282 which is mounted on the elevator chassis and is movable therewith to and from a raised position and a lowered position. The disposition of the storage lift mechanism 282 is shown at the right-hand end of the machine as viewed in FIGURE 3 and is employed for transferring work-supporting arms from a storage position to an operative position. A second storage lift mechanism is provided at another point along the machine for replacing selected ones or successive ones of the work-supporting arms in a storage position. Conventionally, in the specific arrangement illustrated in the drawings, the load station of the machine, as shown in FIGURE 1, is at the right-hand end of the machine and it is usually desirable that the work racks be removed from storage at one or more stations preceding the load station while the work-supporting arms are placed in storage one or two stations beyond the load station. Since the storage lift mechanisms employed for taking work-supporting arms out of storage and for placing the work-supporting arms in storage are substantially identical, a detailed description of one of these storage lift mechanisms is sufficient for a complete understanding of their structural details and operation.

Figure 19:
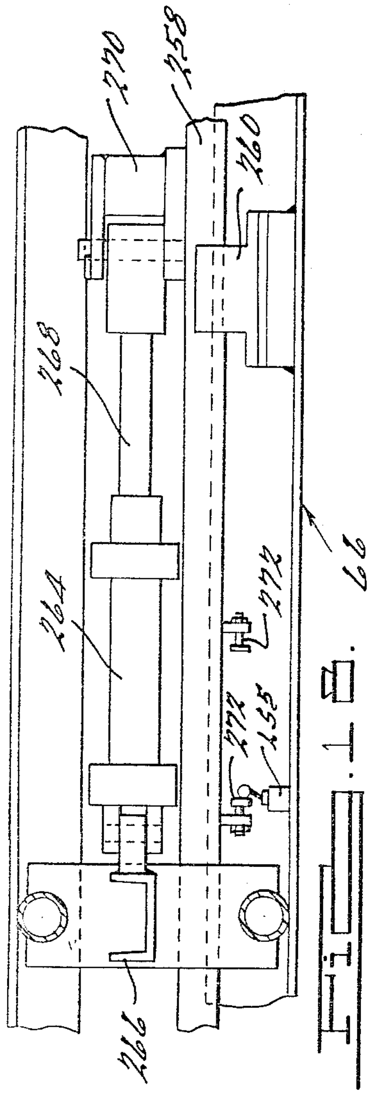
FIG. 19 is a fragmentary side elevational view of the storage lift mechanism mounted on the elevator chassis.
Figure 20:
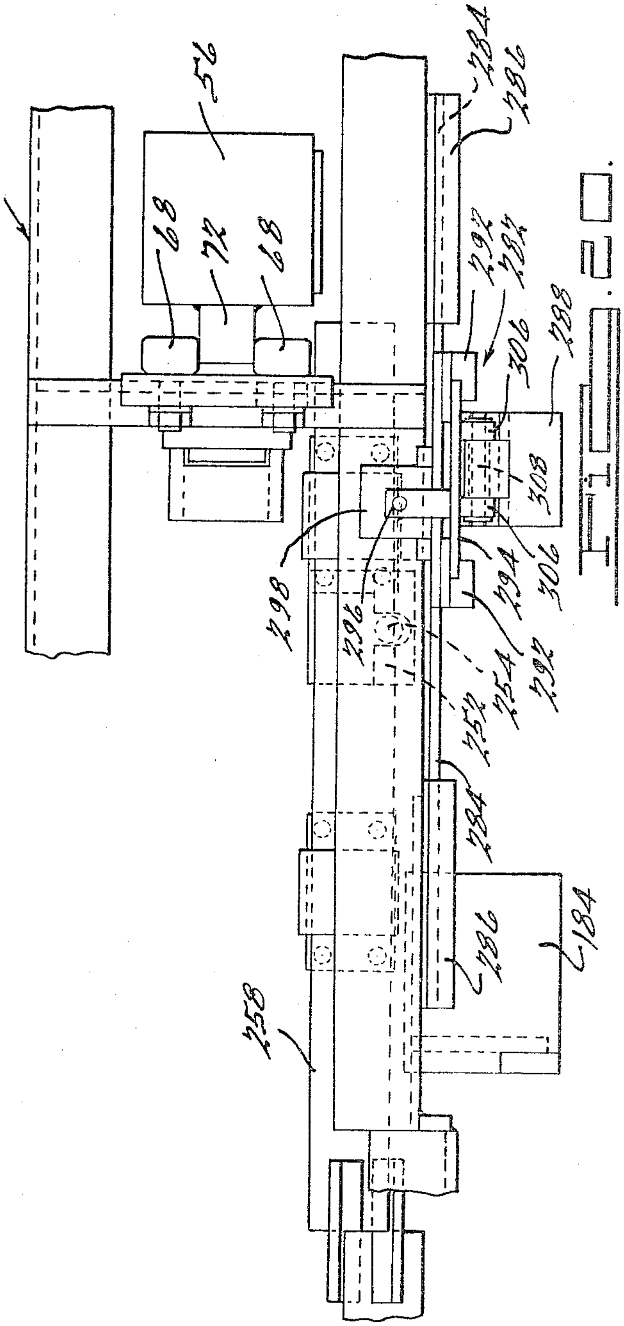
FIG. 20 is a horizontal sectional view of the storage lift mechanism shown in FIGURE 19 and taken along the line 20—20 thereof.
Figure 21:
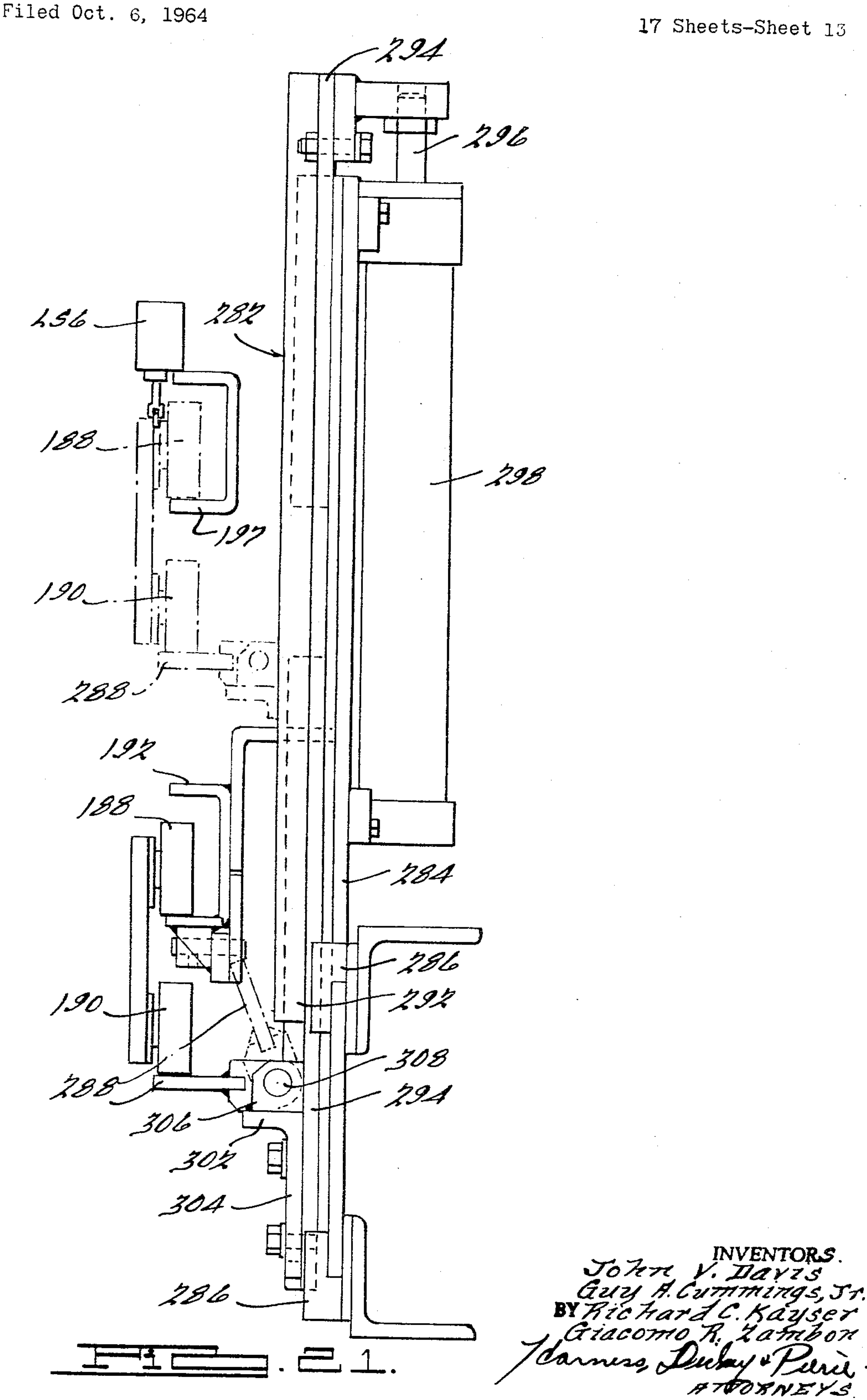
FIG. 21 is a vertical sectional view of the storage lift mechanism as shown in FIGURE 19 and taken along the line 21—21 thereof.

An enlarged fragmentary view of the storage lift mechanism, shown in FIGURE 3, is illustrated in FIGURES 19–21. As shown in FIGURE 3, the storage lift mechanism 282 is disposed adjacent to the output end of a storage rail section 197 for receiving work carriers which are to be taken out of storage and for returning them to the normal treating cycle. The storage lift mechanism comprises an inverted T-shaped plate 284 which is slidably engaged along opposite ends of its upper and lower edges by guide shoes 286 for longitudinal reciprocation, in accordance with the longitudinal reciprocation of the drive member 258 to which it is connected by means of a bifurcated engaging member 252 disposed in engaging relationship with a pin 254, as best seen in FIGURE 20. The plate 284 is movable to and from an advanced position as shown in solid lines in FIGURE 19, in which a pivotally mounted lift pad 288 is disposed in vertical alignment with the output end of the storage track section 197 to a retracted position longitudinally spaced therefrom, as shown in phantom. The left-hand edge of the plate 284 is provided with an elongated aperture 290 to permit retraction thereof without any interference with a stationary lift pad 184 mounted on the chassis adjacent thereto. Two pairs of vertically extending guide shoes 292 are mounted on the face of the inverted T-shaped plate 284 in which a vertical slide plate 294 is slidably positioned and on which the pivotally mounted lift pad is mounted.

The upper end of the slide plate 294, as best seen in FIGURE 21, is connected to the end of a piston rod 296 of a double-acting fluid-actuated lift cylinder 298 mounted to the rearward surface of the plate 284. The lift cylinder 298, as shown in FIGURE 21, is in the normally retracted position in which the pivotally mounted lift pad 288 is disposed at a level corresponding to the remaining movable and stationary lift pads mounted on the elevator chassis 66. In that position, the upper supporting roller 188, as shown in FIGURE 21, is disposed in alignment with the output end of a supporting track section 192 for receiving a work-supporting arm transferred from the preceding treating station. When the lift cylinder 298 is extended and with the elevator chassis in its raised position, the pivotally mounted lift pad 288 is disposed in a position as shown in phantom in FIGURE 21 in which it is positioned at a level to support the lower supporting roller 190 of a work carrier in the raised storage position as it is transferred out of the output end of a storage track section 197 in which the upper supporting roller 188 is disposed in rolling bearing contact. It will be apparent from the foregoing that the pivotally mounted lift pad 288 operates in a manner similar to the other remaining movable lift pads and for the same purpose when the lift cylinder 298 is not actuated. It is only at such times that when a work carrier in the storage position is advanced along the storage rail section 197 that the lift cylinder 298 is actuated in order to lift the pivotally mounted lift pad 288 to an elevated position to receive and support the work carrier by its lower supporting roller 190.

During periods when the storage lift mechanism is not energized, the pivotally mounted lift pad 288, as best seen in FIGURE 19, is moved from an operative position as shown in solid lines in alignment with the output end of a pivotally mounted extension 300 of the supporting track section 192 to an inoperative position longitudinally retracted therefrom, as shown in phantom. The retraction of the lift pad from the operative position to the inoperative position enables the work carrier which is deposited at the completion of the descending movement of the elevator chassis to remain in the down position for one or more subsequent treating stations. The elevator chassis subsequently is raised to the position as shown in FIGURE 19, in which the pivotally mounted lift pad 288 is disposed below the extension 300. At such times, however, when a carrier is to be taken out of storage, it is necessary to effect energization of the lift cylinder 298, whereby the lift pad 288 is advanced upwardly while in the retracted position, effecting pivoting movement of the pivotally mounted extension 300 from the position as shown in solid lines to the position as shown in phantom. When the lift pad 288 clears the pivotally mounted extension 300, as shown in phantom in FIGURE 19, the member 300 returns to its normal down position in alignment with the supporting track section 192. The lift pad 288 is thereafter moved from the retracted position to an advanced position during the course of the transfer movement of the work carriers.

Actuation of the lift cylinder 298 can be achieved manually, remotely, or by a suitable limit switch such as the limit switch LS6, as shown in FIGURES 19 and 21, which is positioned along the storage rail 197 and is actuated in response to the advancement of a supporting roller assembly of a work carrier in storage position as it is advanced along the storage rail section 197. The extension of the lift cylinder 298 is coordinated by the central control system to occur during the ascending movement of the elevator chassis and, conversely, is retracted during the descending movement of the elevator chassis.

The construction of a storage lift mechanism for taking work racks from an operative position and placing them in a storage position is substantially identical to that heretofore described in connection with the storage lift mechanism shown in FIGURES 19–21. In the operation of the mechanism for placing work racks into storage, the lift cylinder is operative to effect a raising of the work carrier beyond the normal elevated position such that its upper supporting roller 188 is in alignment with the input end of a storage track section whereupon, during the next advancing stroke of the transfer mechanism, the work carrier is moved off the lifting pad and in supporting relationship on the storage track section. The lift pad is thereafter longitudinally retracted and the lift cylinder is also retracted during the descending movement of the elevator chassis such that the lift pad passes downwardly and adjacent to the next work carrier to be raised to an elevated position. During the descending movement of the elevator chassis and the storage lift mechanism, an obstruction may occur between the lift pad and the end portion of the adjacent supporting track section when the lift pad is in a longitudinally retracted position. In such event, the lift pad is pivotally mounted, as illustrated by the lift pad 288, as shown in FIGURES 19–21, enabling upward pivoting movement thereof, to a clearance position in a counterclockwise direction, to a position as shown in phantom in FIGURE 21. After the obstruction is passed, the pivotally mounted lift track 288 again returns through the action of gravity, to a horizontal position in which it is maintained by virtue of the extending flange 302 of a cross member 304. The pivoting action of the lift pad 288 is provided by a pair of upwardly extending ears 306 affixed to the upper surface of the extending flange 302 through which a pivot pin 308 extends. Actuation of the lift cylinder of the lift mechanism employed for placing work racks into storage, can be controlled in the same manner as previously described, including a suitable limit switch such as the limit switch LS6 which may be actuated by a presettable actuator on the work carrier.

Suitable latching means are provided on each work carrier for maintaining the work-supporting arm in a raised storage position for all or a portion of its travel around the conveying machine. In the specific embodiment as shown in the drawings, and as may be best seen in FIGURES 4, 5, 6 and 22, a latching key 310 is slidably mounted in a slide shoe 312 affixed to an angle iron member 314 secured to the upper cross member 104 of each carriage frame 100. The latching key 310 is laterally movable from an inoperative position as shown in solid lines in FIGURE 5 to an operative or engaging position as shown in phantom in which the inward end portion of the latching key 310 is disposed beneath the bight portion of an inverted U-shaped hanger 316 affixed to the upper end of the carriage 118 (FIGURE 6). The latching key 310 is provided with an upstanding engaging pin 318 which is operable to coact with an angularly disposed cam plate 320 for extracting the engaging key from the engaging position or for projecting the engaging key into the engaging position.

As will be noted in FIGURES 5 and 22, the cam plate 320 is secured to the end of a lever 322 which is angularly movable from an inoperative position as shown in solid lines in FIGURE 5 to an operative position as shown in phantom, in which the side surface thereof is disposed in camming relationship with the engaging pin 318, effecting an extraction or withdrawal thereof in response to the transfer movement of the work carriage. Movement of the lever 322 between the operative and inoperative position is achieved by a fluid-actuated cylinder 324 mounted on the cross member 96 on the upper machine frame, which is provided with a clevis pin 326 on the end of its piston rod which is pivotally connected to the upper end of the lever 322. As will be noted in FIGURE 4, two such camming mechanisms are provided. One camming mechanism is disposed adjacent to the storage lift mechanism employed for placing work racks in the storage position, whereupon, after the work rack is supported on the storage track section 197 (FIGURE 21), the cylinder 324 is energized, moving the cam plate 320 to the operative position such as shown in FIGURE 22, effecting movement of the latching key 310 from a nonengaging position, as shown in solid lines, to an engaging position as shown in phantom, in response to further advancing movement of the work carrier. In the engaging position, the inward end portion of the latching key is disposed below and in supporting relationship relative to the hanger 316, maintaining the carriage in the raised position after the work carrier is advanced beyond the output end of the storage track section. Conversely, the camming mechanism adjacent to the storage lift mechanism for taking work carriers out of storage is oriented relative to the engaging pin on the latching key to effect a retraction thereof to a nonengaging position when the work carrier upper supporting roller 188 is supported on the storage track section 197 at a point prior to the output end thereof. In order to effect withdrawal of the latching key, the cam plate 320 is reversed from the position shown in FIGURE 22 so as to engage the pin 318 while in the fully retracted position and effect movement thereof to the fully projected position in which the inward end portion of the latching key is withdrawn from a position beneath the bight portion of the hanger 316.

Energization of the cylinders 324 of the camming mechanisms can be achieved manually, remotely, as well as automatically by suitable actuator means carried on the work carrier which are presettable to and from an actuating position and a nonactuating position. Ordinarily, the cylinders of the camming mechanism are remotely actuated and are maintained in the actuated position such as at the initiation of a processing run in which all of the work carriers are in the storage position. In such a situation, as each work carrier is advanced toward the output end of the storage track section, the cam plate effects disengagement of the latching key, whereupon that work carrier is transferred by the storage lift mechanism on the elevator chassis from the raised storage position to a fully lowered operative position at one or more stations preceding the load station. Conversely, at the completion of an operating run, each work carrier, after being unloaded, is lifted to the elevated storage position and wherein the cam plate of the camming mechanism is positioned in the operative position, effecting a successive latching of each latching key with the supporting hanger of each carriage maintaining the work carriers in the storage position until all work carriers are in the full raised storage position.

It will also be appreciated that the latching and camming mechanism, as hereinabove described, can be satisfactorily employed for maintaining the work-supporting arm assemblies in an elevated position corresponding to the intermediate lift position shown in phantom in FIGURE 5. In such event, it is only necessary to extend the height of the hanger 316 (FIGURE 6) so as to be engageable by the latching key when in the normal elevated position, providing an intermediate storage position as desired. The use of the camming and latching mechanism can also be satisfactorily employed for effecting a retention of the work-supporting arm of selected ones of the work carriers in a raised position for a selected portion of the treating stations whereby the workpieces suspended therefrom skip treatment in those treating stations. Variations in the number of stations thus skipped can be achieved by providing a series of camming mechanisms disposed at longitudinally spaced intervals, each selectively operable to effect disengagement of the latching key. In such event, the unlatching of the latching key occurs while the upper supporting roller 188 is supported on a support track section 192 during its transfer movement, and a lift pad is provided at the output end of the supporting track section for receiving and supporting the lower support roller 190 of the carrier, followed by a lowering of the work carrier to the lowered position in response to the descending movement of the elevator chassis.

Selective energization of cam mechanisms similar to those employed for placing the work-supporting arms in a storage and nonstorage position can be suitably achieved, for example, by a series of transversely mounted limit switches indicated at 328 in FIGURE 4 attached to the underside of a cross beam 330 affixed to the upright column 56, each of which is selectively actuable by a series of presettable actuators 332 mounted on a member 334 affixed to and projecting rearwardly of the carriage frame 100. It will be apparent from the foregoing that by appropriately presetting one of the actuators 332, which may conveniently be done at the load station in accordance with the specific type of workpieces loaded on the work-supporting arm, selected ones of the limit switches 328 will be actuated during the course of the travel of the work carriers along the machine, effecting a selective latching and unlatching key 310 thereon, thereby retaining the work rack in a raised position for one or more portions of the treating cycle, which greatly enhances the versatility and flexibility of the processing machine. By virtue of this feature, two or more different types of workpieces can be concurrently processed on the machine which require differences in the total treatment time in one or more of the multiple-station treating receptacles.

In addition to providing for a skip operation, the selective latching and unlatching mechanism, in combination with the selectively actuable camming mechanism, enables a selective delayed set-down operation wherein selected ones of the work-supporting arms are lowered into a multiple-station treating receptacle at a point intermediate the length thereof. The delayed set-down operation effects a proportionate reduction in the total treatment time to which the workpieces are subjected in the multiple-station tank consistent with the desired or intended end use of the workpieces. At each such station where a delayed set-down operation is to be achieved, a movable lift pad 186, such as previously discussed in connection with FIGURE 16, is provided for receiving the work carrier as it is advanced from the output end of a supporting track section 192, effecting a lowering thereof and an immersion of the workpieces thereon into the treating solutions therebelow. The moveable lift pad is thereafter retracted in a manner as previously described to an inoperative retracted position whereby the work-supporting arm remains in the lowered position during the subsequent ascending movement of the elevator chassis.

Still further processing and flexibility and versatility can be achieved in accordance with the conveying machine comprising the present invention so as to provide for an early pickup of selected ones of the work-supporting arms, whereby the work racks suspended therefrom are subjected to a proportionately shorter treatment in a multiple-station treating receptacle. In accordance with the early pickup feature, selected ones of the work-supporting arms can be lifted out of a multiple-station treating receptacle at an intermediate station therealong, effecting a skipping of the remaining stations of that receptacle. This can conveniently be achieved in accordance with the mechanism illustrated in FIGURE 16A of the drawings, wherein a movable lift pad 186 is provided at one or more selected stations of a multiple-station treating receptacle and is normally disposed in a retracted or inoperative position in which it is out of vertical lifting alignment with the lower supporting roller of the work carrier. The lift pad 186 is retained in the inoperative or retracted position such as by a suitable coil spring indicated at 336 in FIGURE 16B, having one end thereof attached to the chassis framework and the other end thereof affixed to the slide plate 248. Movement of the slide plate beyond the retracted position is prevented by a suitable stop 337 as shown in FIGURE 16B, which is operative to engage the edge of the slide plate 248 when in the fully retracted position.

At such time that a selected work carrier arm is to undergo an early pickup operation, suitable actuators such as the actuators 332, as shown in FIGURE 4, one of which is preset for an early pickup operation, effects a tripping of the appropriate limit switch 328, effecting thereby an energization of a solenoid 338, as shown in FIGURE 16A, effecting movement of the engaging pin 254 from an inoperative nonengaging position, as shown in solid lines to an operative engaging position as shown in phantom. For this purpose, the engaging pin 254 is suitably mounted in a transverse slot 340 in the pad 256 for guided reciprocatory movement between the engaging and nonengaging position. When in the engaging position, the engaging pin 254 is disposed in engaging relationship with the bifurcated engaging member 252 affixed to and projecting inwardly from the slide plate 248. Accordingly, during the next reciprocating movement of the drive member 258, the movable selectively actuable lift pad 186 is moved from the retracted position to the projected position beneath the lower supporting roller of a work carrier in the lowered position. In that position, the work carrier is elevated in response to the elevating movement of the elevator chassis and the raised work carrier is thereafter transferred to an adjoining auxiliary support track section in a manner previously described. While on the support track section, a camming mechanism of the type described in connection with FIGURES 4 and 5 is actuated, effecting movement of the latching key on the work carrier to the engaging position, retaining the arm in the elevated position for the balance of the treating stations of the multiple-station tank. At the last station of the multiple-station tank, the latching key is again disengaged, enabling the work carrier, as desired, to enter the first station of the next adjoining treating receptacle. Alternatively, a series of auxiliary support track sections can be provided, extending above the remaining stations of the multiple-station treating receptacles for engaging and supporting the upper supporting roller 188 of the work carrier maintaining the supporting arm assembly in the raised position. The individual auxiliary supporting track sections are interconnected at their input and output ends by hingedly mounted track segments in a manner subsequently described in connection with FIGURES 27–31.

The engaging pin 254 of the selectively actuable movable lift pad is moved from the engaging position to the nonengaging position at the completion of the retracting movement of the drive members 258 after the elevator chassis has attained the raised position and during the advancing movement of the transfer mechanism. This can be conveniently achieved in response to the tripping of limit switch LS5 (FIGURE 18) by the actuator 274, whereupon the solenoid 338 is de-energized, effecting a resilient withdrawal of the engaging pin. The selectively actuable lift pad accordingly remains in the retracted position until the next work carrier which is to undergo an early pickup operation effects the tripping of the appropriate limit switch, effecting a reenergization of the solenoid 338 in a manner as previously described.

As hereinbefore mentioned, the movable mounting of the slide 136 on the arm 130 of each of the work-supporting arm assemblies enables a lateral reciprocatory movement or a rotary oscillating movement to be applied to the arm, effecting thereby a corresponding agitation of the work racks immersed in the treating solutions when the arm is in the fully lowered position. An oscillatory agitation system will now be described, with particular reference to FIGURES 2, 3, 23 and 24. As will be noted in FIGURES 2 and 3, the V-shaped support 150 extends longitudinally along a portion of the length of the machine and is supported at longitudinally spaced intervals by agitation assemblies 342 affixed to the upright braces 60 of the lower machine frame. As best seen in FIGURE 3, a drive motor 344 is coupled to a speed reducer 346, the output shafts of which are connected by couplings 348 to the input shafts of each of the agitator assemblies 342. Each agitator assembly is in turn connected to the next adjacent agitator assembly by means of extension shafts 350 interconnected by similar couplings 348. Accordingly, energization of the motor 344 effects concurrent driving of each of the agitator assemblies in a manner as hereinafter described in connection with FIGURES 23 and 24.

Figure 23:
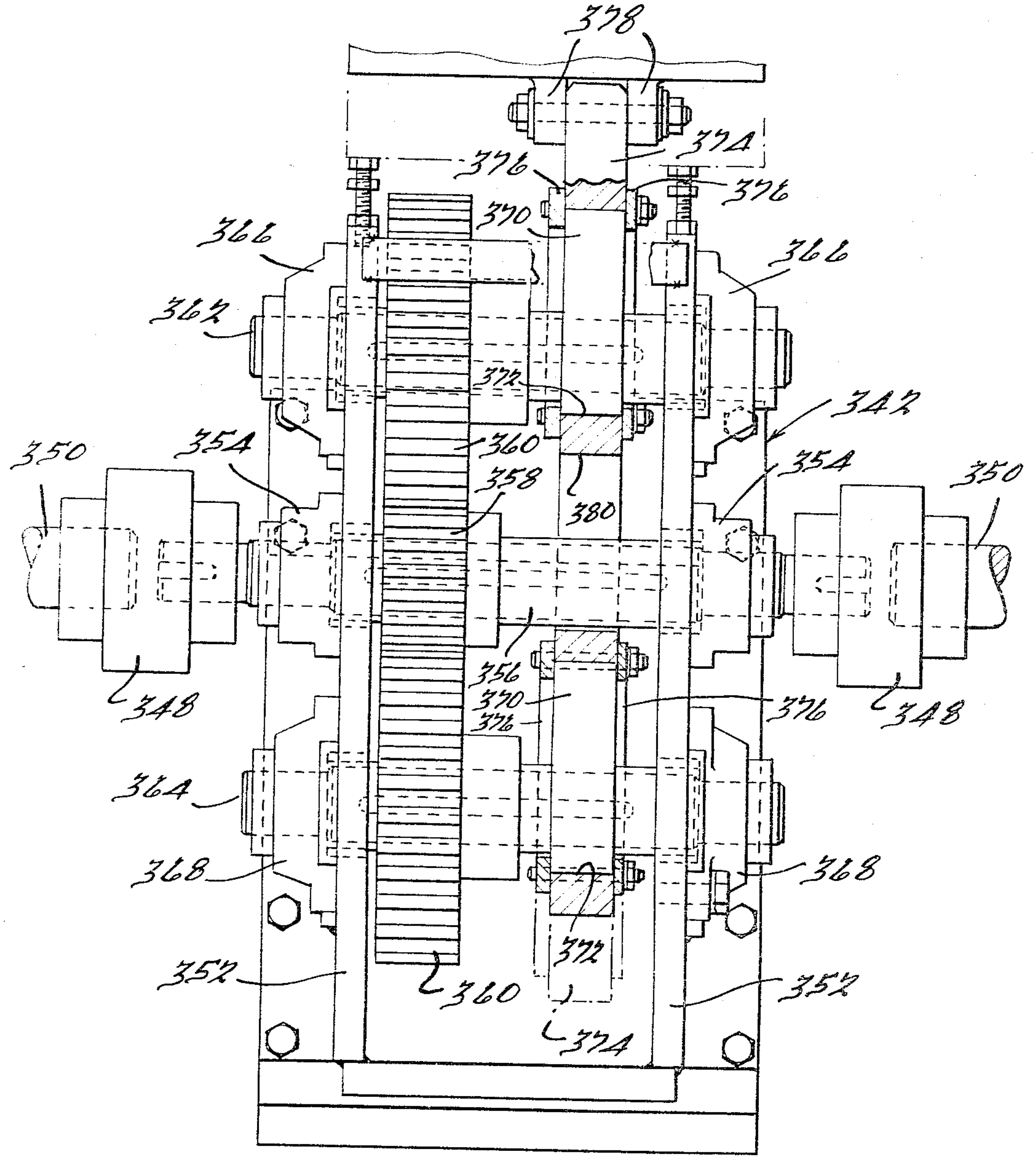
FIG. 23 is an enlarged front elevational veiw of the gear and cam drive arrangement for imparting an orbital movement to the work carrier arm and effecting agitation of the work rack supported therefrom.
Figure 24:
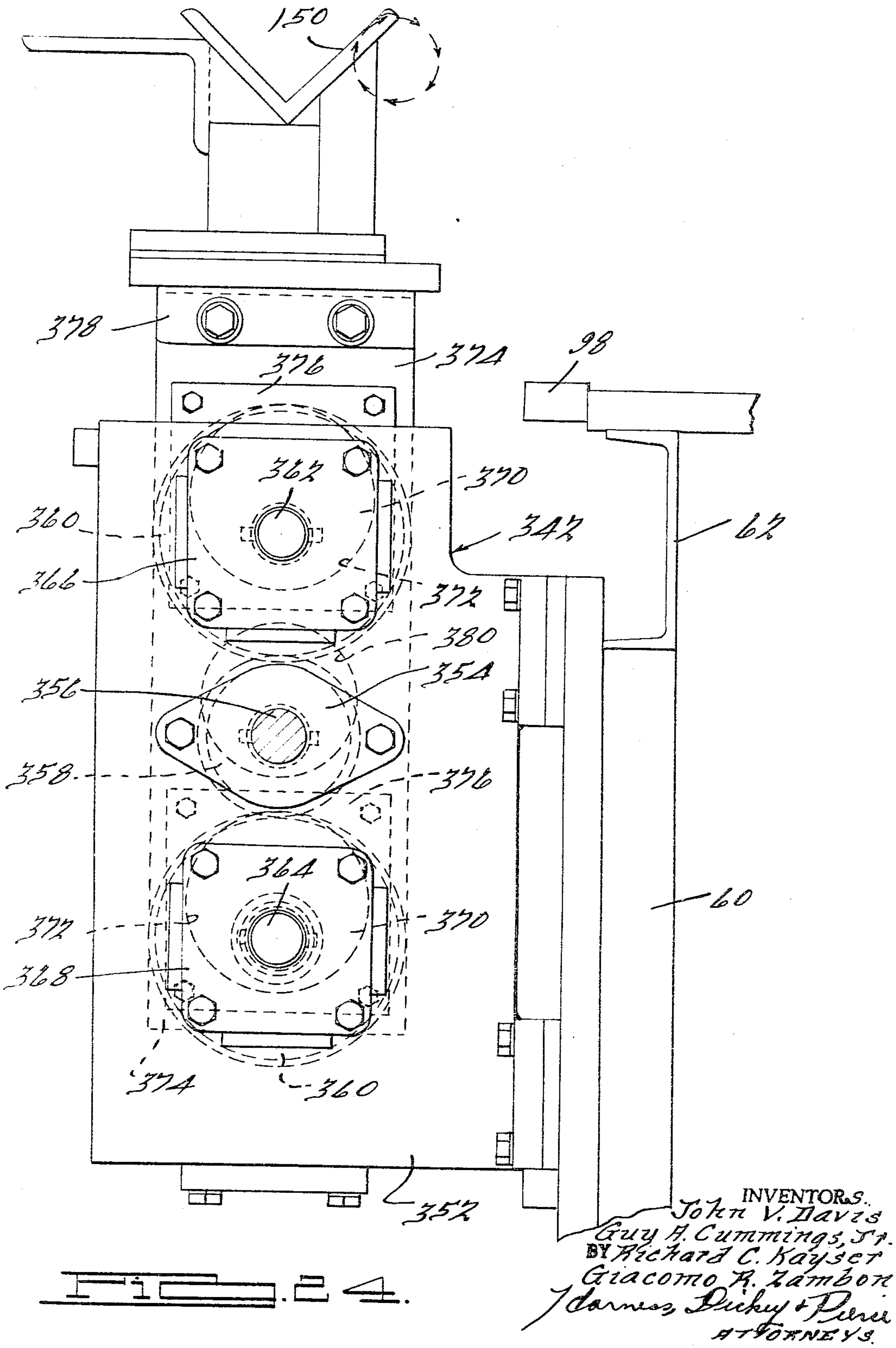
FIG. 24 is a side elevational view of the agitation mechanism as illustrated in FIGURE 23.

The agitator assembly 342, as shown in detail in FIGURES 23 and 24, comprises a pair of side plates 352 disposed in spaced substantially parallel relationship to substantially the center portions, to which plates a bearing block 354 is secured for rotatably supporting the ends of a drive shaft 356 connected at opposite ends thereof to the couplings 348. A drive gear 358 is keyed to the drive shaft 356 and is disposed in constant meshing relationship with a driven gear 360 mounted on an upper idler shaft 362 and on a lower idler shaft 364. The end portions of the upper idler shaft 362 are rotatably supported in bearing blocks 366 affixed to the outer surfaces of the side plates 352 and the ends of the lower idler shaft 364 are similarly supported in bearing blocks 368. It will be apparent from the foregoing relationship that the rotation of the drive shaft 356 effects concurrent rotation of the two idler shafts 362, 364 in the same direction. A circular cam 370 is splined or keyed to each of the idler shafts 362, 364 in eccentric relationship thereto, which in turn are disposed with the peripheries thereof in sliding bearing contact against circular apertures 372 formed in an oscillating plate 374. Inadvertent longitudinal movement of the oscillating plate 374 relative to the circular cams 370 is prevented by a pair of overlying clamping plates 376 affixed to opposite side surfaces of the oscillating plate 374 adjacent to the apertures 372 therein, as may be best seen in FIGURE 23. The upper end of the oscillating plate 374 is securely fastened to a pair of depending ears 378 affixed to the frame on which the V-shaped support 150 is mounted. The oscillating plate 374 is also provided with an enlarged aperture 380 through which the drive shaft 356 extends and is disposed in clearance relationship relative to the wall thereof in all moved positions of the oscillating plate.

The agitator assembly 342, as viewed in FIGURES 23 and 24, is positioned with the circular cams 370 at their maximum height, whereupon the oscillating plate 374 is likewise positioned as shown in solid lines at its maximum elevation. Concurrent rotation of the circular cams 370 from the position as shown in solid lines in FIGURES 23 and 24 through an interval of 180° results in a corresponding retracting or lowering of the oscillating plate and the V-shaped support thereon to a position as shown in phantom corresponding to the lowermost position. At intervening positions therebetween, the circular cams 370 effect lateral movement of the oscillating plate, resulting in a combined oscillating or rotary movement as indicated by the dotted circle at the upper end of FIGURE 24. This circular oscillating path of travel is true for all points on the oscillating plate as well as the V-shaped support which in turn imparts a corresponding oscillating movement to the slide 136 supported by its contact pad 148 in seated supporting relationship in the V-shaped support 150. The horizontal component of the rotary movement is achieved by the lateral sliding movement of the slide 136 relative to the arm 130 (FIGURE 4) while the vertical component of the rotary movement is provided by the rolling coaction of the carriage 118 on the carriage frame 100. Accordingly, the work racks suspended from the work-supporting arm assembly undergo a corresponding movement while immersed in the treating solutions, effecting agitation thereof.

It will be noted by virtue of the construction of the agitator assembly, as shown in FIGURES 23 and 24, that during the entire course of the rotary travel the oscillating plate 374 is maintained in a substantially vertical position since the circular cams 370 on the upper idler shaft 362 and lower idler shaft 364 are disposed in substantially the same position of eccentricity. Accordingly, a good seating contact between the V-shaped contact pad 148 (FIGURE 4) and the V-shaped support 150 (FIGURE 24) is maintained, preventing thereby any possible interruption in the flow of electrical current to the workpieces during the oscillating movement.

An alternative horizontal agitation assembly is also employed which extends along selected portions of the machine, imparting a lateral movement of the slide 136 of each of the work-supporting arms when in the lowered position and a corresponding horizontal reciprocating movement to the work racks, effecting agitation thereof while immersed in the treating solutions. As shown in FIGURE 2, a suitable motor-gear reducer drive assembly 382 is mounted on a platform 384 and to the output shaft in which a drive shaft 386 is coupled. The drive shaft 386 is rotatably supported at longitudinally spaced intervals in pillow blocks 388, and is formed at one end thereof with an eccentric 390 having a drive pin 392 affixed to and projecting from the end face thereof. As best seen in FIGURES 25 and 26, the drive pin 392 is disposed in bearing relationship against the sides of an elongated aperture 394 formed in the end of a lever 396 which is pivotally secured at its center portion to a bracket 398 affixed to the machine frame. The lower end portion of the lever 396 is slidably supported in a guide shoe 400 to maintain oscillation thereof in a plane substantially perpendicular to the axis of the drive shaft 386. The upper end of the lever 396 is pivotally secured by means of a pin 402 to a pair of depending ears 404 affixed to the underside of the box beam 152.

The box beam 152, including the V-shaped support 150 and the contact pad 158 mounted on the upper surface thereof, is mounted at longitudinally spaced intervals for horizontal lateral reciprocation on short guide tracks 406 which are attached to and supported from the central frame. As best seen in FIGURES 25 and 26, a pair of upper rollers 408 are disposed in rolling bearing contact against the upper surface of the guide track 406, whereas a lower roller 410 is disposed in rolling bearing contact along the underside of one edge of the guide track 406.

Accordingly, rotation of the eccentric 390 by the drive shaft 386 effects an oscillating movement of the lever 396 from a central vertical position, as shown in solid lines in FIGURE 26, to angularly spaced positions as shown in phantom, effecting a corresponding horizontal shifting movement of the box beam 152 along the guide tracks 406. The coaction of the V-shaped contact 148 (FIGURE 4), disposed in seated relationship in the V-shaped support 150, effects a corresponding horizontal, lateral movement to the slide 136 of the work-supporting arm assembly, whereby the work rack suspended therefrom undergoes a lateral horizontal agitation in the treating solutions.

Under conventional operating conditions, the agitator assembly, as shown in FIGURES 23 and 24, and the horizontal agitation assembly as illustrated in FIGURES 25 and 26 remain energized throughout the operation of the conveying machine. Accordingly, those work-supporting arms which remain in the lowered position, such as when disposed along a multiple-station treating receptacle, are in continuous agitation, including periods during their transfer from one station to the next adjacent treating station. By virtue of the V-shaped contactor 148 on the slide 136 of the work-supporting arms, smooth engagement and disengagement of the slide with the oscillating or reciprocating V-shaped support 150 is achieved during the lowering movement as well as during the lifting movement of the supporting arm to and from the lowered position. Inadvertent longitudinal drift of the work carrier when in the lowered position is prevented by the locking relationship of the pusher bar and latching mechanism as previously described in connection with FIGURE 15. Additionally, the slide 136 is unlocked from the arm 130 in response to the descending movement of the contact 156, effecting an extraction of the locking pin 174, in accordance with the mechanism illustrated in FIGURE 8, at a point just prior to contact of the V-shaped contact 144 with the V-shaped support 150 during the descending movement of the work-supporting arm assembly, and is again locked at a point after disengagement of the V-shaped contact with the V-shaped support during the subsequent lifting movement of the work-supporting assembly. It will be apparent, in accordance with the arrangement as illustrated, that an integrated uniform, compound agitation movement can be provided to selected ones of the work racks along selected portions of the machine employing a single drive source, substantially simplifying the entire machine structure in comparison to the various agitation devices heretofore known.

A typical operating cycle of the machine will now be described, with particular reference to the diagrammatic drawings as illustrated in FIGURES 27–31. In the arrangement as diagrammatically illustrated in FIGURE 27, a three-station multiple-treating receptacle T2 is incorporated, followed by a single-station treating receptacle T1, followed thereafter by either a multiple-station treating receptacle or drying station. These stations, for the purposes of convenience, have been numbered S1 through S6, inclusive. Station S1 corresponds to the first station of the multiple-treating receptacle T2 in which the work racks are successively lowered and remain in the lowered position until they are withdrawn at the last station S3. For this purpose, a movable lift track section indicated at L1 is provided on the elevator chassis above station S1, while a movable lift track section L3 is provided on the elevator chassis above station S3. As previously set forth, it is sometimes desirable to provide for an early pickup operation of selected ones of the work carriers at a station intermediate of a multiple-station tank, and in the exemplary embodiment illustrated a selectively actuable lift pad L2 is provided on the elevator chassis above station S2 for selectively withdrawing certain ones of the work racks and maintaining that work rack in the raised position for the balance of the multiple-station receptacle. In addition, a stationary lift track L4 is provided on the elevator chassis above the station S4 in the single-station tank since each work rack which is not in a skip or storage position is lowered and raised at station S4, in response to the descending and ascending movement of the elevator chassis. A storage lift pad L5 is provided above station S5 for selectively moving work racks from storage and placing them in a lowered position prior to the load station.

Figures 27, 28, 29, 30, 31:
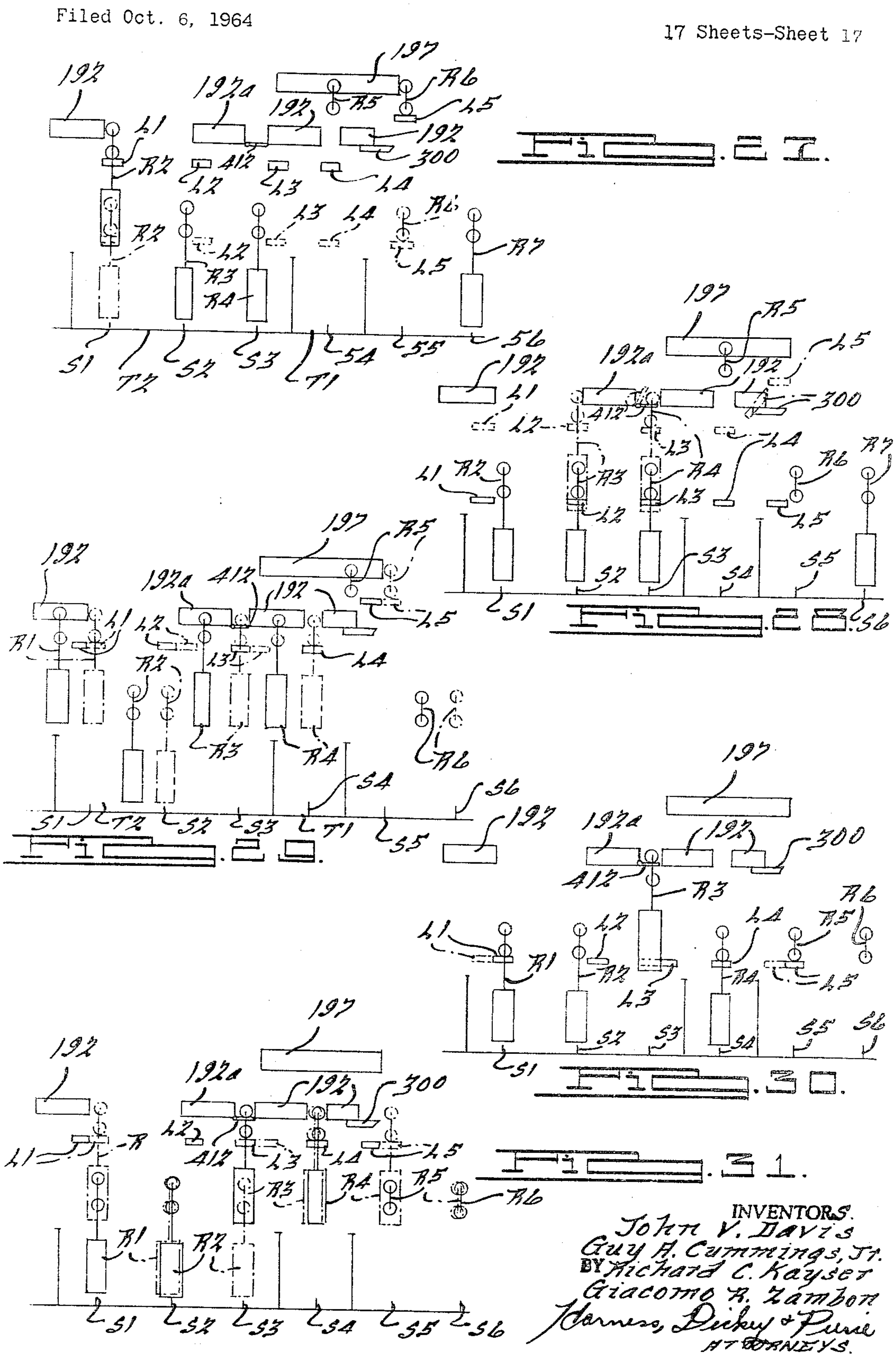

In the position as shown in FIGURE 27, the elevator chassis is in the raised position in which the lift pads L1–L4 are in the raised position and the lift pad L5 is further extended to support the lower supporting roller of the carrier R6 which has been advanced beyond the output end of the storage rail section 197. A second work carrier, indicated at R5, is supported on the storage track section. In this position, the lift cylinder is energized, effecting movement of the elevator chassis from the raised position to the lowered position, whereup the work carriers R2 and R6 are lowered from the position as shown in solid lines in FIGURE 27 to the lowered position as shown in phantom. At the completion of the descending movement of the elevator chassis, as signalled by the tripping of lower lift limit switch LS2 (FIGURE 5), a suitable down-dwell timer is energized which commences to time a preselected treatment period. During the down-dwell-treatment period, the hydraulic cylinder in the elevator chassis is energized, effecting movement of the movable lift pads L1, L3 and L5 from the position as shown in phantom in FIGURE 27 to the position as shown in solid lines in FIGURE 28.

Let it be assumed that the work carrier R3, including actuators 332 thereon (FIGURE 4), is preset so as to trip a limit switch 328 so as to undergo an early pickup operation. In such event, the solenoid as shown in FIGURE 16A is energized, effecting engagement of the lift pad L2 with the drive member, whereupon it is retracted from a position as shown in phantom in FIGURE 27 out of alignment with the supporting rollers on the work rack R3 to the position shown in FIGURE 28, in which it is disposed beneath and in lifting alignment relative thereto. It will be understood that the selective activation of a limit switch, such as the limit switches 328, can be achieved during the up and down movement of the carriage relative to the machine frame or movement of the elevator chassis relative to the carriage frame. In the latter condition, a presettable actuator can be mounted on the carriage frame which is operable to coact with a limit switch on the elevator chassis during its vertical movement, thereby providing the desired selectivity.

At the expiration of the treatment time, as signalled by the timing out of the down-dwell timer, the lift cylinder is again energized, effecting movement of the elevator chassis and the lift pads thereon from the position as shown in solid lines in FIGURE 28 to a raised position as shown in phantom, whereupon the work carriers R3 and R4 and the work racks thereon are withdrawn from the treating solution in the multiple-station treating tank T2. During the ascending movement of the elevator chassis, the transfer mechanism is retracted from the fully advanced position to the fully retracted position. When the elevator chassis attains the fully raised position, as signalled by the tripping of up-position limit switch LS1 (FIGURE 5), the transfer cylinder is energized, effecting a transfer of the work carriers toward the next treating station. It will be noted in FIGURE 28 that the movable lift pad L5 on the take-out storage mechanism has been elevated to a position above the normal position in which it is adapted to receive and movably support the lower supporting roller on the work carrier R5.

During the ascending movement of the lift pad L5 from the lowered position, as shown in solid lines in FIGURE 28, to the raised position as shown in phantom, the lift pad, while in the retracted position, contacts and effects a pivoting of the extension member 300 to the position shown in phantom. After the lift pad clears the extension member 300, it pivots downwardly to the normal operative position as shown in solid lines.

When the work carriers attain an intermediate advanced position, as shown in solid lines in FIGURE 29, the hydraulic cylinder in the elevator chassis is energized, effecting movement of the movable lift pads L1, L2, L3 and L5 from the position as shown in solid lines to the position as shown in phantom. Accordingly, the lift pad L1 is now positioned to receive the work carrier R1 as it completes its advancing movement beyond the output end of the supporting track section 192, and similarly the movable lift pad L5 is moved into a position for supporting the work carrier R5 as it is advanced beyond the output end of the storage track section 197. The movable lift pad L3 has also been retracted to a position where it is no longer in alignment with a work carrier that may be supported in the down position at station S3. It will be further noted in FIGURES 27–29 that the output end of the auxiliary supporting track section, indicated at 192*a*, is provided with a hingedly mounted gap-filling plate 412 which is normally disposed in a downward position, maintaining continuity between the output end or the supporting track section 192*a* and the input end of the adjacent supporting track section 192. The work carrier R3 is accordingly maintained in an elevated skip position above the treating station S3 by the hingedly mounted plate 412 as shown in FIGURES 29 and 30, effecting thereby a preselected reduction in its total treatment time. The gap-filling plate 412 is is operative to swing or pivot to a raised position as shown in phantom in FIGURE 28 in response to coaction with the upper supporting roller on a work carrier such as the carrier R4 during its withdrawal from the treating station S3. The selectively actuable lift pad L3 remains in the retracted inoperative position, as shown in phantom in FIGURE 29, until such time as another work carrier, having its actuator in a preselected position, trips a suitable limit switch, signalling that it is to undergo an early pickup operation.

At the completion of the advancing movement of the pusher mechanism, as signalled by the tripping of forward transfer limit switch LS3 (FIGURE 11), the lift cylinder is again energized, effecting a lowering of the elevator chassis and the lift pads thereon from the position as shown in phantom in FIGURE 29 to the lowered position as shown in solid lines in FIGURE 30. During the descending movement of the elevator chassis, the work carrier R5 has been taken from the storage position and placed in the lowered operating posiition, at which it can be suitably loaded with workpieces for processing through the treating sequence. At the same time, the work carriers R1 and R4 are deposited at stations S1 and S4, respectively. The down-dwell cycle timer is again energized at the completion of the descending movement of the elevator chassis, and during the timing of the down-dwell timer the lift pads L1, L3 and L5 are retracted from the positions as shown in solid lines in FIGURE 30 to the positions as shown in phantom. Accordingly, the movable lift pads L1 and L5 are now disposed out of lifting alignment relative to the work carriers R1 and R5, while the movable lift pad R3 is positioned in alignment with a work carrier which normally would be removed from the last station of the multiple-station treating receptacle T2. The transfer mechanism remains in the fully advanced position, maintaining each of the work carriage frames in a locked position and in appropriate alignment relative to the treating stations S1–S6.

At the completion of the down-dwell treatment period, as signalled by the timing out of the down-dwell timer, the lift cylinder is again energized, effecting movement of the lift pads L1–L6 from the lowered positions, as shown in FIGURE 30, to the raised positions as shown in solid lines in FIGURE 31. Accordingly, work carrier R4 is withdrawn from the single-station treating receptacle T1. During the ascending movement of the elevator chassis, the transfer mechanism is again withdrawn from the fully advanced position to the fully retracted position and, at the completion of the ascending of the chassis as signalled by the tripping of up-position limit switch LS1 (FIGURE 5), the transfer mechanism is again energized, effecting a transfer of the work racks from the positions as shown in solid lines in FIGURE 31 to the positions as shown in the phantom. The operating cycle as hereinbefore described continues, wherein selected ones of the work carriers undergo an early pickup operation at station S2. The operation of the storage lift mechanism for placing all or selected ones of the work racks in a storage position is similar to that described in connection with the take-out storage mechanism, but the positions of the movable lift pad L5 thereon are reversed.

It will be apparent from the description of the conveying machine comprising the present invention, as hereinbefore set forth and as shown in the drawings, that a substantial simplification and a corresponding increase in processing flexibility and versatility can be achieved, in comparison to conveying machines of similar type heretofore known. The variable rack spacing permitted by the use of independently movable work carriers, in combination with the reciprocable transfer mechanism, further coupled with the inclusion of a laterally slidable work-supporting arm, enables a substantial reduction in total machine size for a given number of treating stations, and additionally permits simplification of mechanical agitation means for effecting a controlled movement of the work racks while supported in the treated solutions.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A conveying machine comprising a frame, a pair of vertically spaced rails on said frame, a plurality of work carriers guidably mounted and independently movable along said rails, each of said work carriers including a carriage frame extending between said rails and movably mounted thereon, a carriage movably and guidably mounted on said carriage frame for movement therealong between a raised position and a lowered position, and a work-supporting arm on said carriage and extending laterally therefrom; an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, reciprocable pusher means for engaging and intermittently and independently advancing said work carriers along said rails when said chassis is in said raised position, and locking means coacting with said pusher means for engaging and locking each of said work carriers in a fixed position along said rails at the completion of the advancing movement thereof.

2. A conveying machine comprising a frame, a pair of vertically spaced rails on said frame, a plurality of work carriers guidably mounted and movable along said rails, each of said work carriers including a carriage frame extending between said rails and movably mounted thereon, a carriage movably and guidably mounted on said carriage frame for movement therealong between a raised position and a lowered position, and a work-supporting arm on said carriage and extending laterally therefrom; pusher means for engaging and intermittently advancing said work carriers along said rails, an elevator chassis movably mounted on said frame for movement to and from a raised position and a lowered position, engaging means on each said carriage, a plurality of lift pads including fixed lift pads and movable lift pads carried by said chassis and disposed at longitudinally spaced intervals therealong, said movable lift pads longitudinally reciprocable to and from an operative position in vertical alignment with said engaging means on a carrier to an inoperative position spaced therefrom, said fixed and said movable lift pads when in said operative position effective to engage certain ones of said carriages to effect movement thereof to and from a raised position and a lowered position in response to the ascending and descending movement of said chassis.

3. A conveying machine comprising a frame, a pair of vertically spaced rails on said frame, a plurality of work carriers guidably mounted and movable along said rails, each of said work carriers including a carriage frame extending between said rails and movably mounted thereon, a carriage movably and guidably mounted on said carriage frame for movement therealong between a raised position and a lowered position, and a work-supporting arm on said carriage and extending laterally therefrom; pusher means for engaging and intermittently advancing said work carriers along said rails, an elevator chassis movably mounted on said frame for movement to and from a raised position and a lowered position, engaging means on each said carriage, a plurality of lift pads including fixed lift pads and movable lift pads carried by said chassis and disposed at longitudinally spaced intervals therealong, said movable lift pads longitudinally reciprocable to and from an operative position in vertical alignment with said engaging means on a carrier to an inoperative position spaced therefrom, said fixed and said movable lift pads when in said operative position effective to engage certain ones of said carriages to effect movement thereof to and from a raised position and a lowered position in response to the ascending and descending movement of said chassis, and means for moving said lift pads from one position to the other position during the advancing movement of the work carriers when said chassis is in the raised position and for returning the lift pads to their original position at the completion of the descending movement of said chassis.

4. A conveying machine comprising a frame, a pair of vertically spaced rails on said frame, a plurality of work carriers guidably mounted and movable along said rails, each of said work carriers including a carriage frame extending between said rails and movably mounted thereon, a carriage movably and guidably mounted on said carriage frame for movement therealong between a raised position and a lowered position, and a work supporting arm on said carriage and extending laterally therefrom; pusher means for engaging and intermittently advancing said work carriers along said rails, an elevator chassis movably mounted on said frame for movement to and from a raised position and a lowered position, engaging means on each said carriage, a plurality of lift pads including fixed lift pads and movable lift pads carried by said chassis and disposed at longitudinally spaced intervals therealong, said movable lift pads longitudinally reciprocable to and from an operative position in vertical alignment with said engaging means on a carrier to an inoperative position spaced therefrom, said fixed and said movable lift pads when in said operative position effective to engage certain ones of said carriages to effect movement thereof to and from a raised position and a lowered position in response to the ascending and descending movement of said chassis, power means for reciprocating said movable lift pads between said operative position and said inoperative position, selected ones of said movable lift pads normally disposed in said inoperative position and disengaged from said power means, and means operable for engaging said selected movable lift pads to said power means effecting reciprocation thereof between said positions.

5. A conveying machine comprising a frame, a pair of vertically spaced rails on said frame, a plurality of work carriers guidably mounted and independently movable along said rails, each of said work carriers including a carriage frame extending between said rails and movably mounted thereon, a carriage movably and guidably mounted on said carriage frame for movement therealong between a raised position and a lowered position, and a work supporting arm on said carriage and extending laterally therefrom; pusher means for engaging and intermittently and independently advancing said work carriers along said rails, an elevator chassis movably mounted on said frame for movement to and from a raised position and a lowered position, engaging means on each said carriage, a plurality of lift pads including fixed lift pads and movable lift pads carried by said chassis and disposed at longitudinally spaced intervals therealong, said movable lift pads longitudinally reciprocable to and from an operative position in vertical alignment with said engaging means on a carrier to an inoperative position spaced therefrom, drive means for reciprocating said movable lift pads between the positions, selected ones of said movable lift pads normally disposed in said inoperative position and disengaged from said drive means, means operable responsive to means carried by said work carriers for selectively coupling said selected ones of said movable lift pads to said drive means for a preselected period, said fixed and said movable lift pads when in said operative position effective to engage certain ones of said carriages and effect movement thereof to and from a raised position and a lowered position in response to the ascending and descending movement of said chassis.

6. A conveying machine comprising a frame, a pair of vertically spaced rails on said frame, a plurality of work carriers guidably mounted and movable along said rails, each of said work carriers including a carriage frame extending between said rails and movably mounted thereon and a carriage movably and guidably mounted on said carriage frame for movement therealong between a raised position and a lowered position, an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, and pusher means for engaging and intermittently advancing said work carriers along said rails, each said carriage including a work-supporting arm assembly comprising a support affixed to said carriage and extending laterally of the path of travel of said work carrier, a slide member movably mounted on said support and reciprocable longitudinally thereof, engaging means on said slide member, supporting means extending along at least a portion of the path of travel of said work carriers and disposed to engage said engaging means when said carriage is in said lowered position, and means for effecting movement of said supporting means imparting a corresponding movement to said slide member when engaged thereto.

7. A conveying machine comprising a frame, a pair of vertically spaced rails on said frame, a plurality of work carriers guidably mounted and movable along said rails, each of said work carriers including a carriage frame extending between said rails and movably mounted thereon and a carriage movably and guidably mounted on said carriage frame for movement therealong between a raised position and a lowered position, an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, and pusher means for engaging and intermittently and independently advancing said work carriers along said rails, each said carriage including a work-supporting arm assembly comprising a support affixed to said carriage and extending laterally thereof, a slide member movably mounted on said support, engaging means on said slide member, supporting means disposed to engage said engaging means when said carriage is in said lowered position, means for effecting movement of said supporting means imparting a corresponding movement to said slide member when engaged thereto, and means for locking said slide member to said support preventing relative movement therebetween when said engaging means is disposed out of engagement with said supporting means.

8. A conveying machine comprising a frame, a pair of vertically spaced rails on said frame, a plurality of work carriers guidably mounted and movable along said rails, each of said work carriers including a carriage frame extending between said rails and movably mounted thereon and a carriage movably and guidably mounted on said carriage frame for movement therealong between a raised position and a lowered position, an elevator chassis movably mounted on said frame for movement to and from a raised position and a lowered position, coacting means on said chassis and each said carrier for engaging and moving certain ones of the carriages to and from said raised and said lowered position in response to up and down movement of said chassis, and pusher means for engaging and intermittently advancing said work carriers along said rails, each said carriage including a work-supporting arm assembly comprising a support affixed to said carriage and extending laterally thereof, a slide member movably mounted on said support, engaging means on said slide member, supporting means disposed to engage said engaging means when said carriage is in said lowered position, means for effecting movement of said supporting means imparting a corresponding movement to said slide member when engaged thereto, and means for positioning said slide member relative to said support in response to the ascending movement of said carriage after said engaging means are disengaged from said supporting means.

9. A conveying machine comprising a frame, a pair of vertically spaced rails on said frame, a plurality of work carriers guidably mounted and movable along said rails, each of said work carriers including a carriage frame extending between said rails and movably mounted thereon and a carriage movably and guidably mounted on said carriage frame for movement therealong between a raised position and a lowered position, an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, and pusher means for engaging and intermittently advancing said work carriers along said rails, each said carriage including a work-supporting arm assembly comprising a support affixed to said carriage and extending laterally of the path of travel of said work carrier, a slide member movably mounted on said support and reciprocable longitudinally thereof, engaging means on said slide member, supporting means extending along at least a portion of the path of travel of said work carriers and disposed to engage said engaging means, means for effecting movement of said supporting means imparting a corresponding movement to said slide member when engaged thereby, aligning means for positioning said slide member in an aligned position relative to said support when said slide member is disengaged from said supporting means, and locking means for locking said slide member to said support in said aligned position during periods when said slide member is disengaged from said supporting means.

10. A conveying machine comprising a frame, a pair of vertically spaced rails on said frame, a plurality of work carriers guidably mounted and independently movable along said rails, each of said work carriers including a carriage frame extending between said rails and movably mounted thereon and a carriage movably and guidably mounted on said carriage frame for movement therealong between a raised position and a lowered position, an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, and reciprocable pusher means for engaging and intermittently and independently advancing said work carriers along said rails, each said carriage including a work-supporting assembly comprising an arm affixed to said carriage and a slide member movably mounted on said arm and extending in a direction laterally of the path of travel of said work carriers, engaging means on said slide member, a support disposed to engage said engaging means when said carriage is in said lowered position, means for moving said support member imparting a corresponding movement to said slide member when engaged thereby, locking means on said slide member and said arm for preventing relative movement therebetween, means urging said locking means into locking position, and means operatively connected to said locking means for releasing said locking means in response to the descending movement of said carriage.

11. A conveying machine comprising a frame, a pair of vertically spaced rails on said frame, a plurality of work carriers guidably mounted and independently movable along said rails, each of said work carriers including a carriage frame extending between said rails and movably mounted thereon and a carriage movably and guidably mounted on said carriage frame for movement therealong between a raised position and a lowered position, an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, and reciprocable pusher means for engaging and intermittently and independently advancing said work carriers along said rails, each said carriage including a work-supporting assembly comprising an arm affixed to said carriage and a slide member movably mounted on said arm for reciprocation in a direction laterally of the path of travel of said work carriers, engaging means on said slide member, a support disposed to engage said engaging means when said carriage is in said lowered position, means for moving said support imparting a corresponding movement to said slide member when engaged thereby, locking means on said slide member and said arm for preventing relative movement therebetween, said locking means movable to and from an engaging position and a nonengaging position, means urging the said locking means into engaging position, and means connected to and operative to move said locking means to said nonengaging position, enabling relative movement between said arm and said slide member during the descending movement of said carriage and prior to engagement of said engaging means with said support.

12. A conveying machine comprising a frame, a pair of vertically spaced rails on said frame, a plurality of work carriers guidably mounted and movable along said rails, each of said work carriers including a carriage frame extending between said rails and movably mounted thereon and a carriage movably and guidably mounted on said carriage frame for movement therealong between a raised position and a lowered position, an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, and pusher means for engaging and intermittently and independently advancing said work carriers along said rails, each said carriage including a work-supporting assembly comprising an arm affixed to said carriage and a slide member movably mounted on said arm and extending in a direction laterally of the path of travel of said work carriers, means for moving said slide member relative to said arm, and aligning means including coacting cam means on said slide member and said carriage frame for repositioning said slide member relative to said arm in response to the ascending movement of said carriage.

13. A conveying machine comprising a frame, a pair of vertically spaced rails on said frame, a plurality of work carriers guidably mounted and independently movable along said rails, each of said work carriers including a carriage frame extending between said rails and movably mounted thereon and a carriage movably and guidably mounted on said carriage frame for movement therealong between a raised position and a lowered position, an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, and reciprocable pusher means for engaging and intermittently and independently advancing said work carriers along said rails, each said carriage including a work-supporting assembly comprising an arm affixed to said carriage and a slide member movably mounted on said arm for reciprocation thereon in a direction laterally of the path of travel of said work carriers, cam means on said carriage frame, follower means on said slide member, said follower means operable to engage said cam means in response to the ascending movement of said carriage effecting positioning of said slide member in appropriate lateral relationship to said arm.

14. A conveying machine comprising a frame, a pair of vertically spaced rails on said frame, a plurality of work carriers guidably mounted and movable along said rails, pusher means for engaging and intermittently advancing said work carriers along said rails, each of said work carriers including a carriage frame extending between said rails and movably mounted thereon, a carriage movably and guidably mounted on said carriage frame for movement therealong between a raised position and a lowered position, and a work-supporting arm on said carriage and extending laterally therefrom; an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, latching means on said carriage frame and said carriage for engaging and retaining said carriage in said raised position independently of the movement of said chassis, means operatively associated with said latching means for rendering said latching means operative and inoperative in response to the advancing movement of said work carriers along said rails.

15. A conveying machine comprising a frame, a pair of vertically spaced rails on said frame, a plurality of work carriers guidably mounted and independently movable along said rails, pusher means for engaging and intermittently and independently advancing said work carriers along said rails, each of said work carriers including a carriage frame extending between said rails and movably mounted thereon, a carriage movably and guidably mounted on said carriage frame for movement therealong between a raised position and a lowered position, and a work-supporting arm on said carriage and extending laterally therefrom; an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, latching means on said carriage frame and said carriage for engaging and retaining said carriage in said raised position independently of the movement of said chassis, cam means disposed adjacent to the path of travel of said work carriers and movable to and from an operative position and an inoperative position, said cam means when in said operative position effective to move said latching means to and from a latching position and a nonlatching position in response to the advancing movement of said work carriers.

16. A conveying machine comprising a frame, a pair of vertically spaced rails on said frame, a plurality of work carriers guidably mounted and independently movable along said rails, pusher means for engaging and intermittently and independently advancing said work carriers along said rails, each of said work carriers including a carriage frame extending between said rails and movably mounted thereon, a carriage movably and guidably mounted on said carriage frame for movement therealong between a raised position and a lowered position, and a work-supporting arm on said carriage and extending laterally therefrom; an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, latching means on each of said work carriers for retaining said carriage in said raised position independently of the movement of said chassis, said latching means comprising an engaging member movably mounted on said carriage frame and movable to and from an engaging position and a nonengaging position, means on said carriage for engaging said engaging member when in said engaging position and when said carriage is in said raised position, first cam means and second cam means on said frame disposed adjacent to the path of travel of said engaging means, each said cam means movable to and from an inoperative position and an operative position in camming relationship relative to said engaging means, means for moving said first cam means to said operative position for moving said engaging means to said engaging position in response to the advancing movement of said work carriers, and means for moving said second camming means to said operative position for moving said engaging means to said inoperative position.

17. A conveying machine comprising a frame, a pair of vertically spaced rails on said frame, a plurality of work carriers guidably mounted and independently movable along said rails, pusher means for engaging and intermittently and independently advancing said work carriers along said rails, each of said work carriers including a carriage frame extending between said rails and movably mounted thereon, a carriage movably and guidably mounted on said carriage frame for movement therealong between a raised position and a lowered position, and a work-supporting arm on said carriage and extending laterally therefrom; an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, auxiliary lift means on said chassis for engaging and moving certain ones of said carriages to and from a storage position spaced above said raised position, and latching means on said carriage frame and said carriage for engaging and retaining said carriage in said storage position indepedently of the movement of said chassis.

18. A conveying machine comprising a frame, a pair of vertically spaced rails on said frame, a plurality of work carriers guidably mounted and independently movable along said rails, pusher means for engaging and intermittently and independently advancing said work carriers along said rails, each of said work carriers including a carriage frame extending between said rails and movably mounted thereon, a carriage movably and guidably mounted on said carriage frame for movement therealong between a raised position and a lowered position, and a work-supporting arm on said carriage and extending laterally therefrom; an elevator chassis movably mounted on said frame for movement to and from a raised position and a lowered position, coacting means on said chassis and each said carriage for engaging and moving certain ones of the carriages to and from said raised and said lowered position in response to up and down movement of said chassis, an auxiliary lift mechanism carried on said chassis for engaging and moving certain ones of said carriages to and from a storage position spaced above said raised position, latching means on said carriage frame and said carriage for engaging and retaining said carriage in said raised position independently of the movement of said chassis, and means operable to selectively render said latching means effective and ineffective in response to the advancing movement of said work carriers.

19. A conveying machine comprising a frame, a pair of vertically spaced rails on said frame, a plurality of work carriers movably mounted on said rails, each of said work carriers including a frame extending between said rails and movably mounted thereon, a carriage movably and guidably mounted on said carriage frame for movement therealong between a raised position and a lowered position, and a work-supporting arm on said carriage and extending laterally therefrom; an elevator chassis movably mounted on said frame for movement to and from a raised position and a lowered position, coacting means on said chassis and each said carriage for engaging and moving certain ones of the carriages to and from said raised and said lowered position in response to the up and down movement of said chassis, pusher means for engaging and intermittently advancing said carriers along said rails, auxiliary lift means on said chassis for engaging and moving certain ones of said carriages to and from a storage position spaced above said raised position, and latching means for retaining said carriage in said storage position independently of the movement of said chassis.

References Cited by the Examiner

UNITED STATES PATENTS

| | | | |
|---|---|---|---|
| 2,849,097 | 8/1958 | Jackson | 198—19 |
| 2,972,403 | 2/1961 | Barton | 198—19 |
| 2,975,882 | 3/1961 | Abbey | 198—19 |
| 3,073,324 | 1/1963 | Finston | 198—19 X |
| 3,119,486 | 1/1964 | Davis | 198—19 |
| 3,158,249 | 11/1964 | Harper et al. | 198—19 |
| 3,193,121 | 7/1965 | Kumpf et al. | 198—19 X |
| 3,225,896 | 12/1965 | Krueger et al. | 198—170 |

EVON C. BLUNK, *Primary Examiner.*

A. C. HODGSON, *Assistant Examiner.*